Sept. 29, 1953  W. R. BECKMAN ET AL  2,653,317
HAMMER TYPE STAPLING MACHINE
Filed Sept. 1, 1951  10 Sheets-Sheet 5
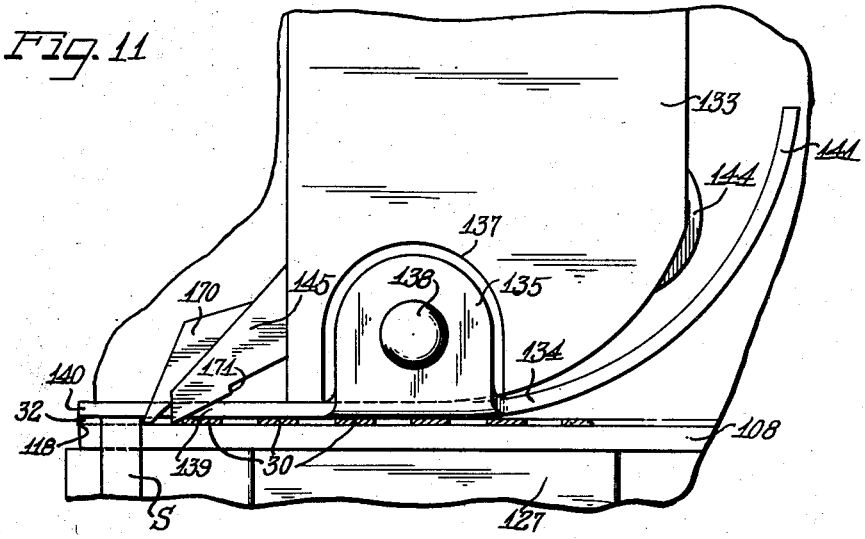
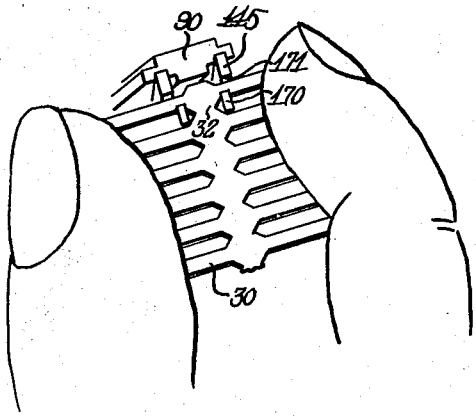
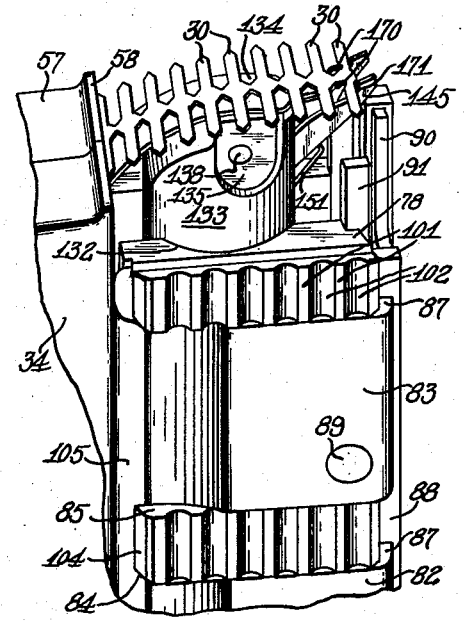
Inventors:
William R. Beckman
Arthur G. Schilke
Charles E. Crooks

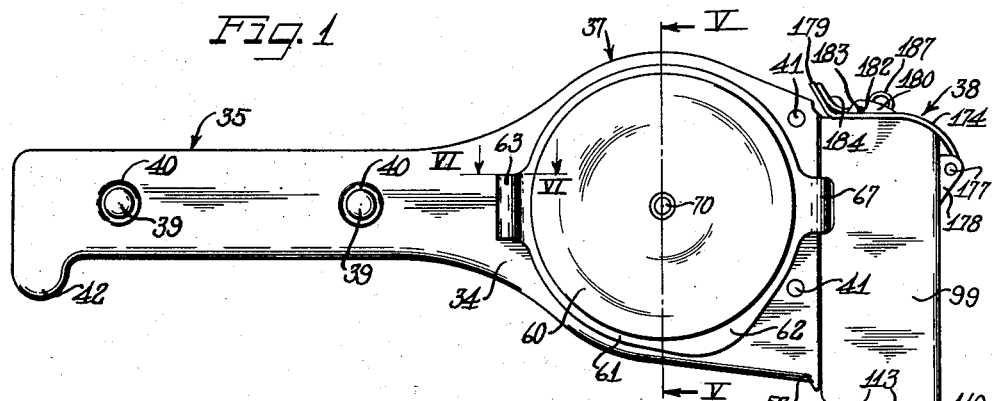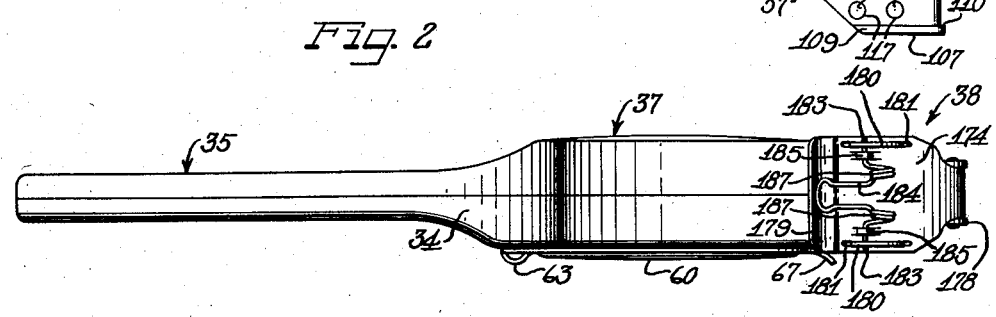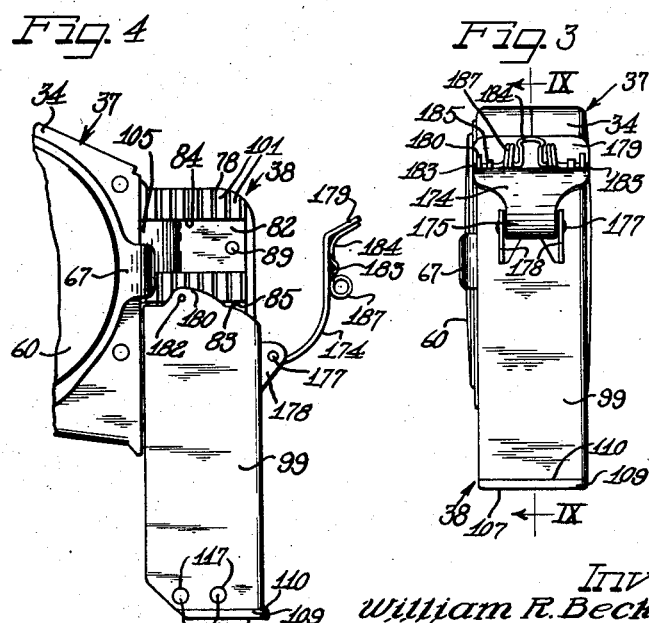

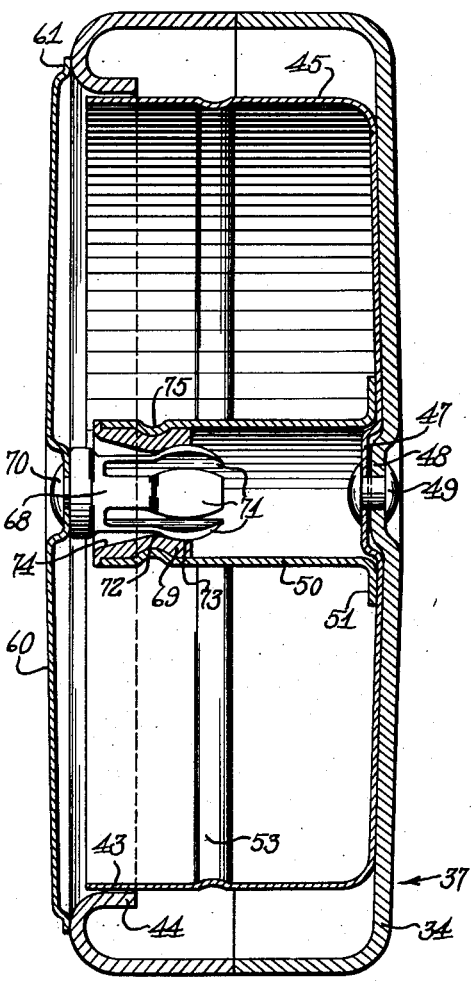
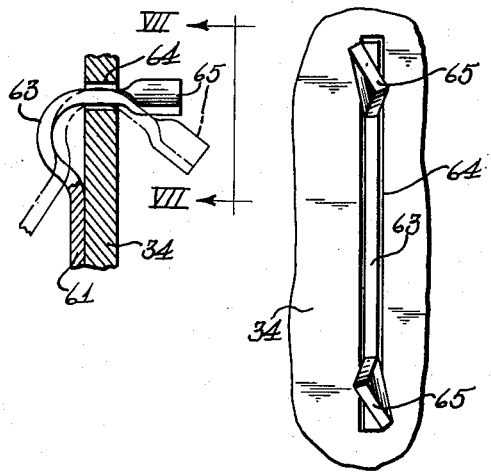
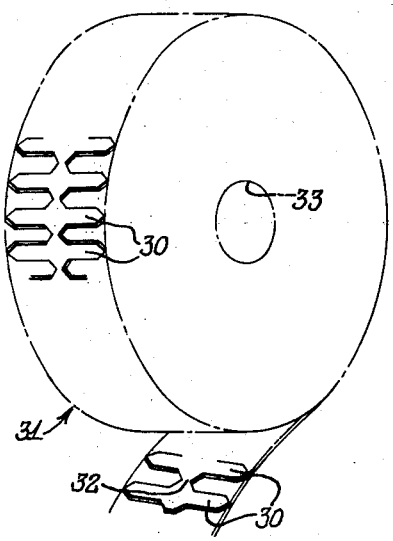

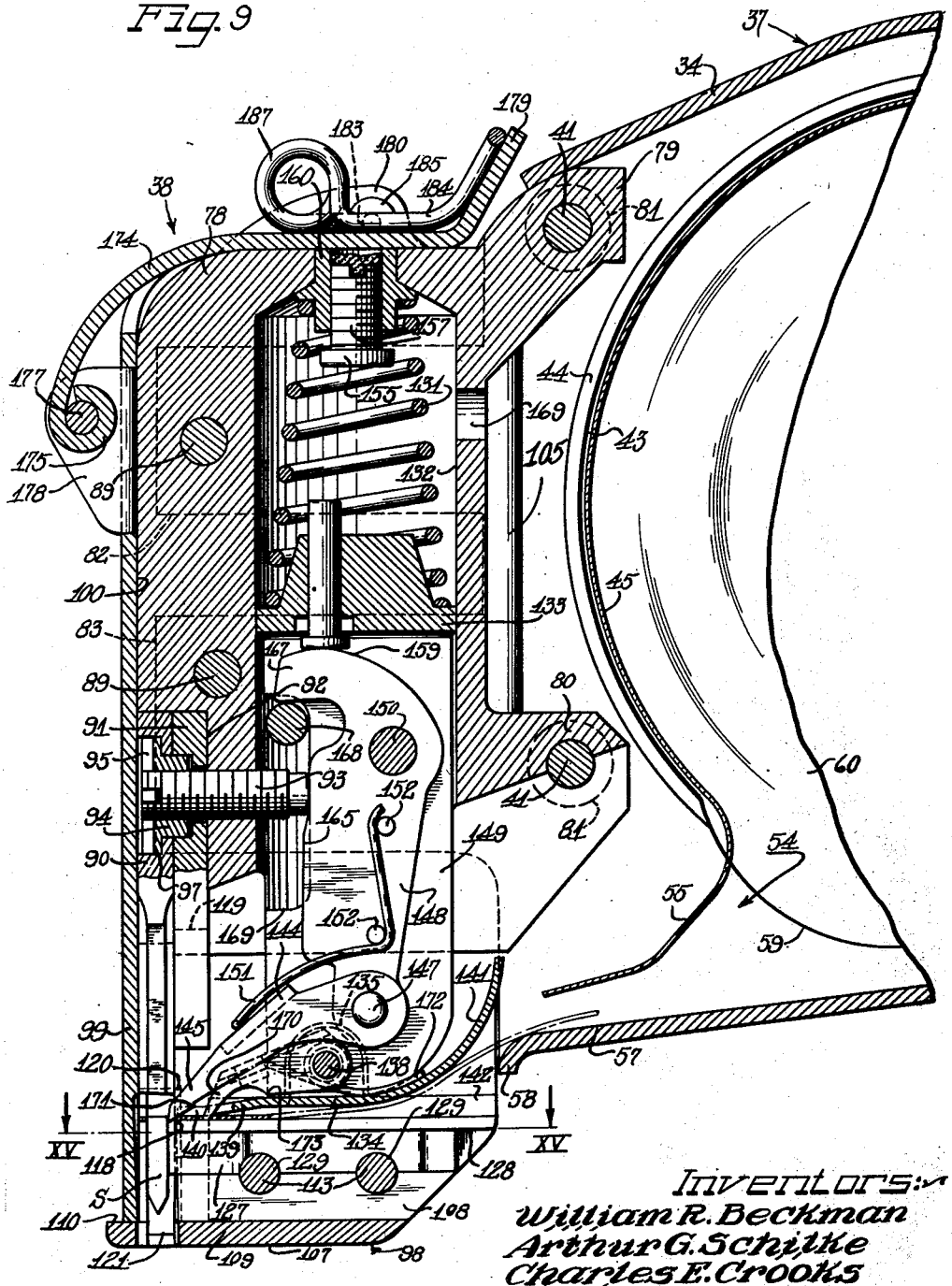

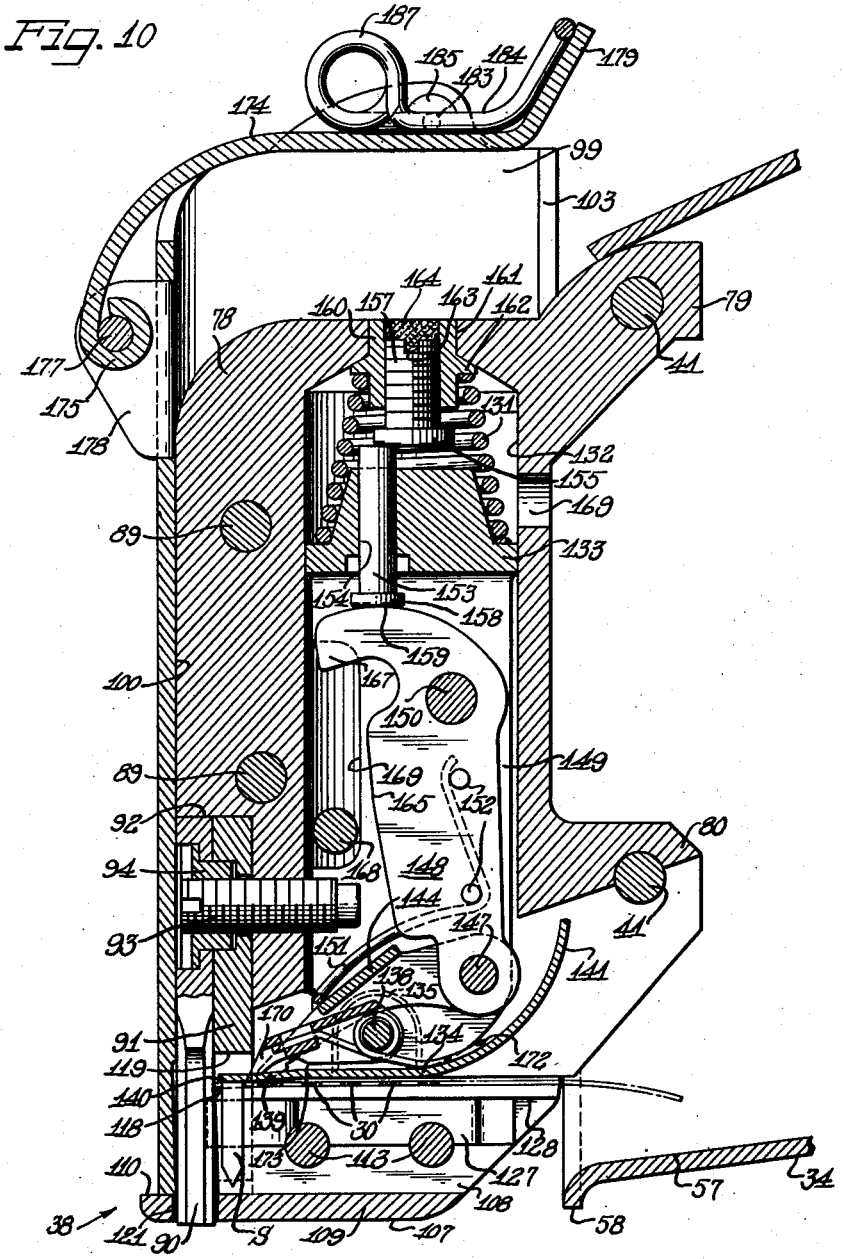

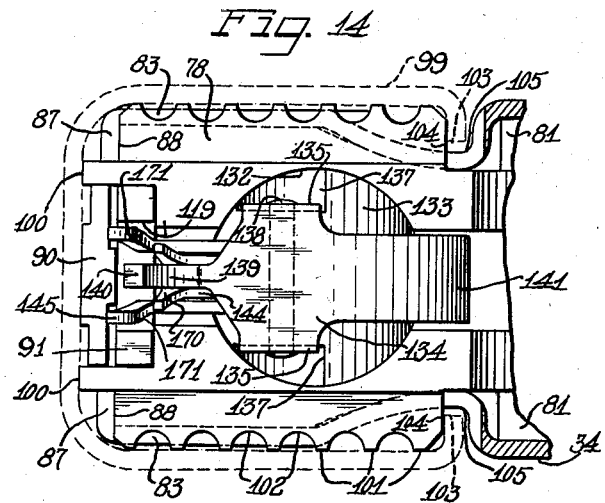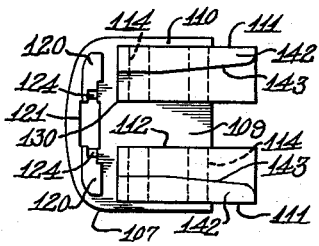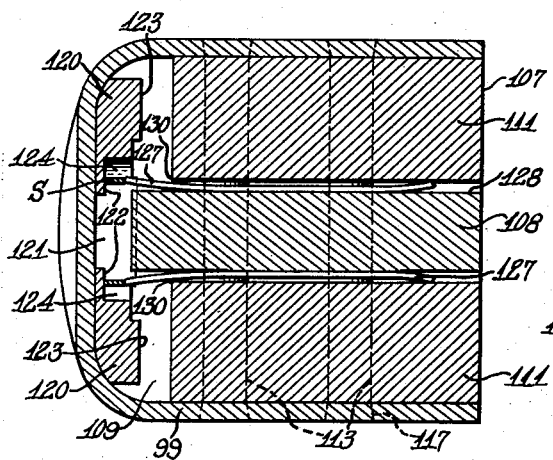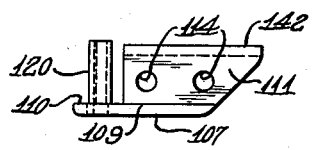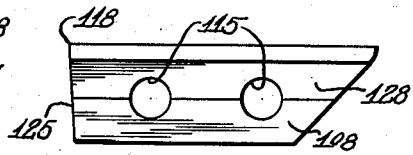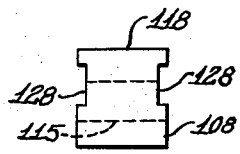

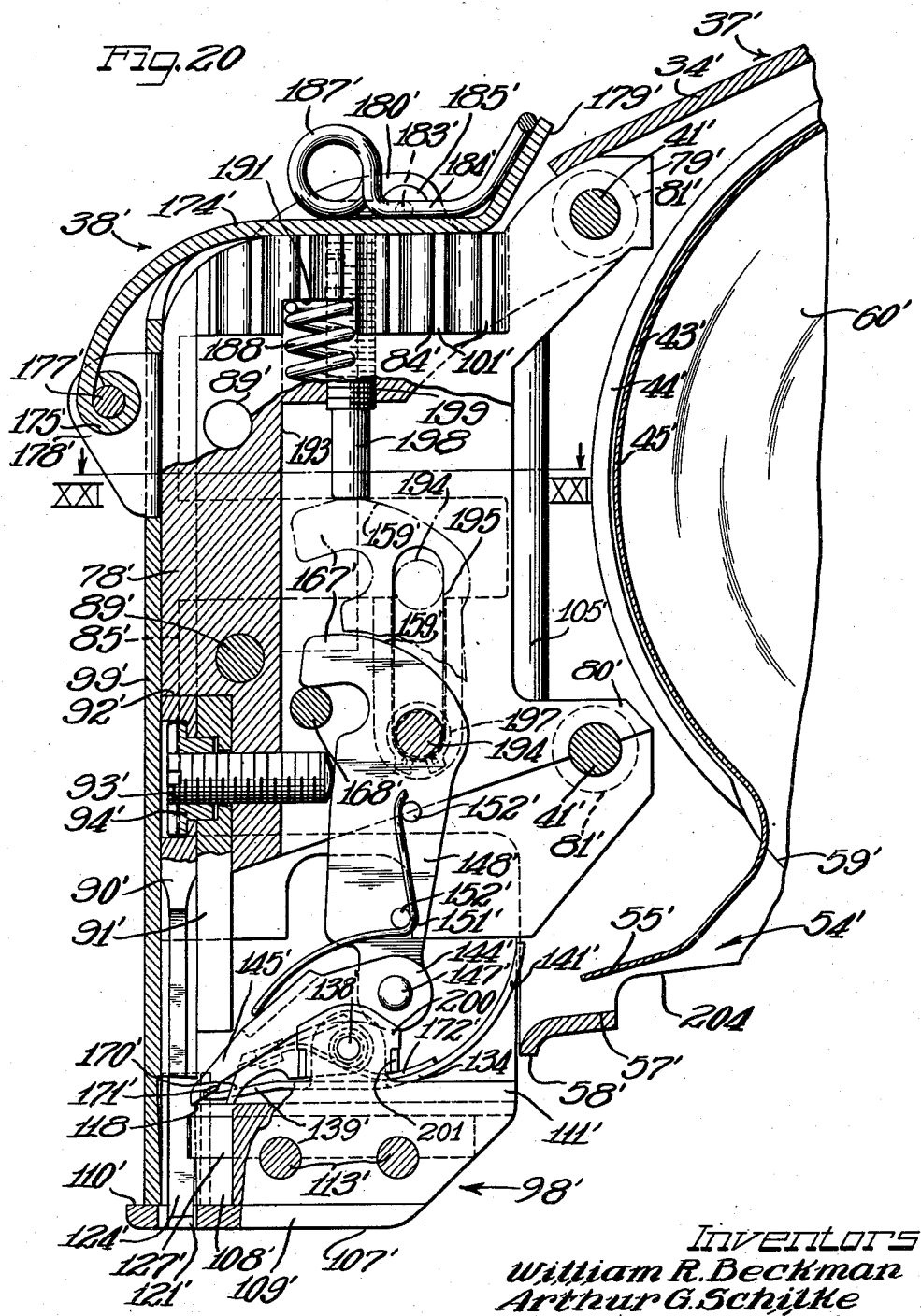

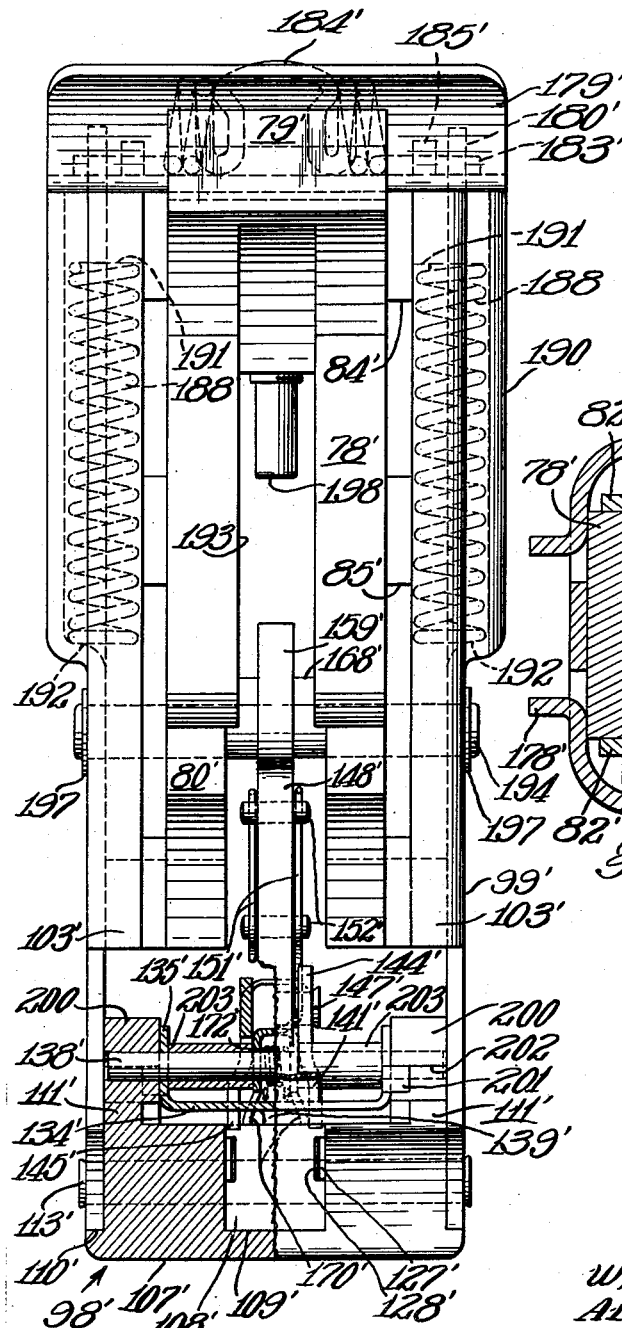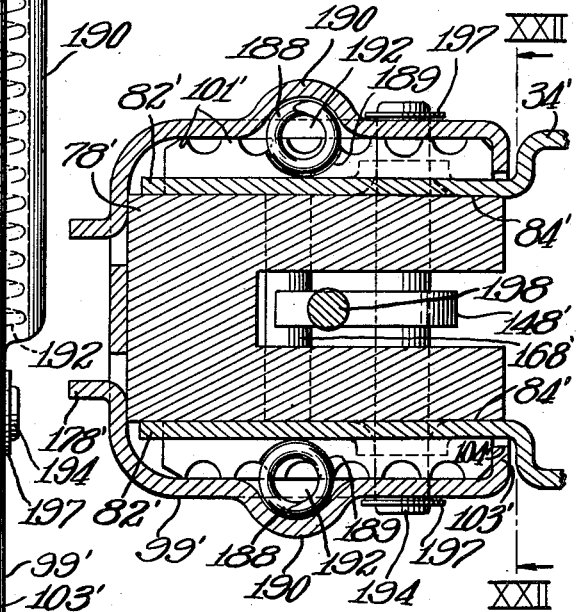

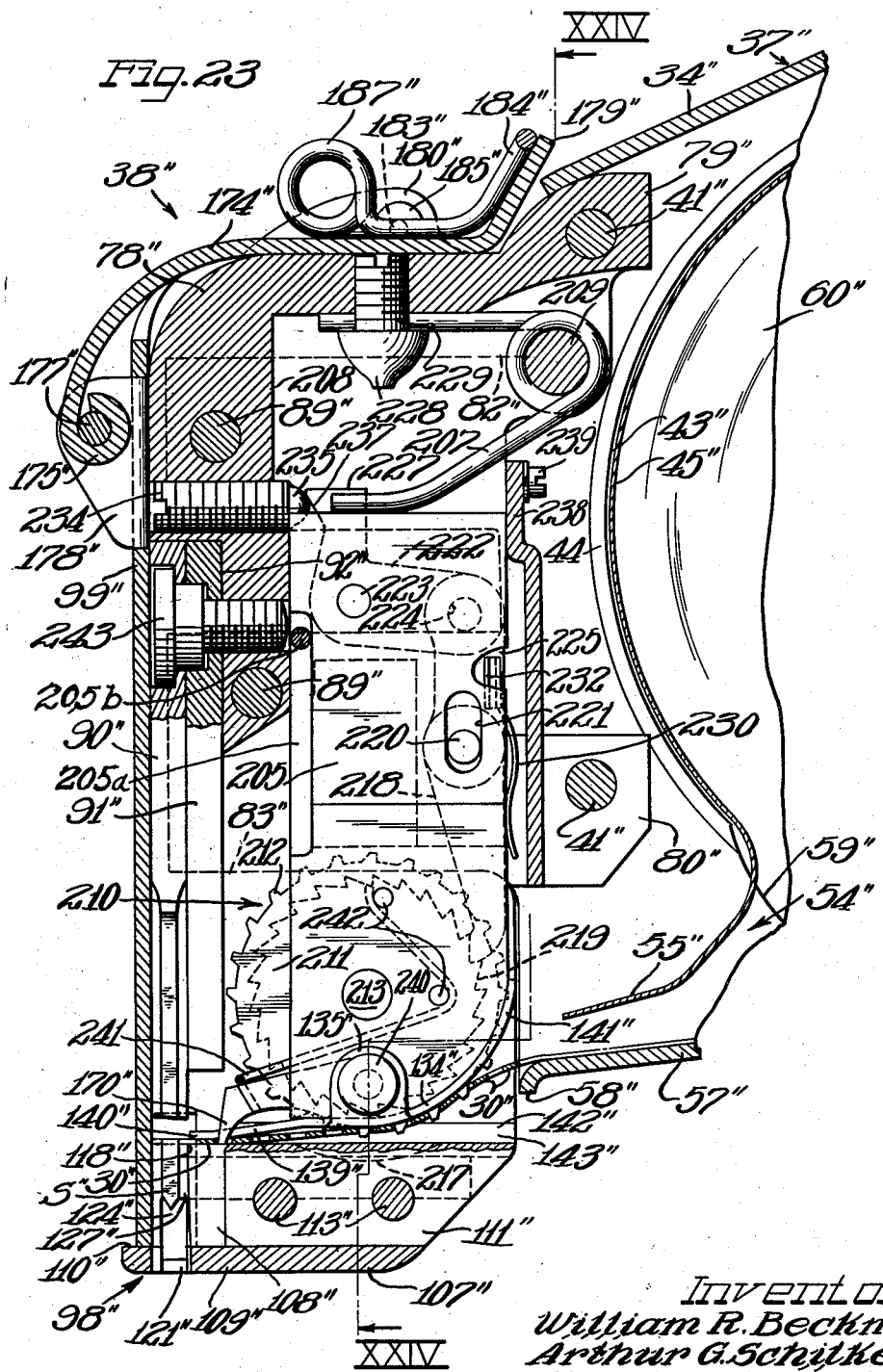

Sept. 29, 1953    W. R. BECKMAN ET AL    2,653,317
HAMMER TYPE STAPLING MACHINE
Filed Sept. 1, 1951    10 Sheets-Sheet 10
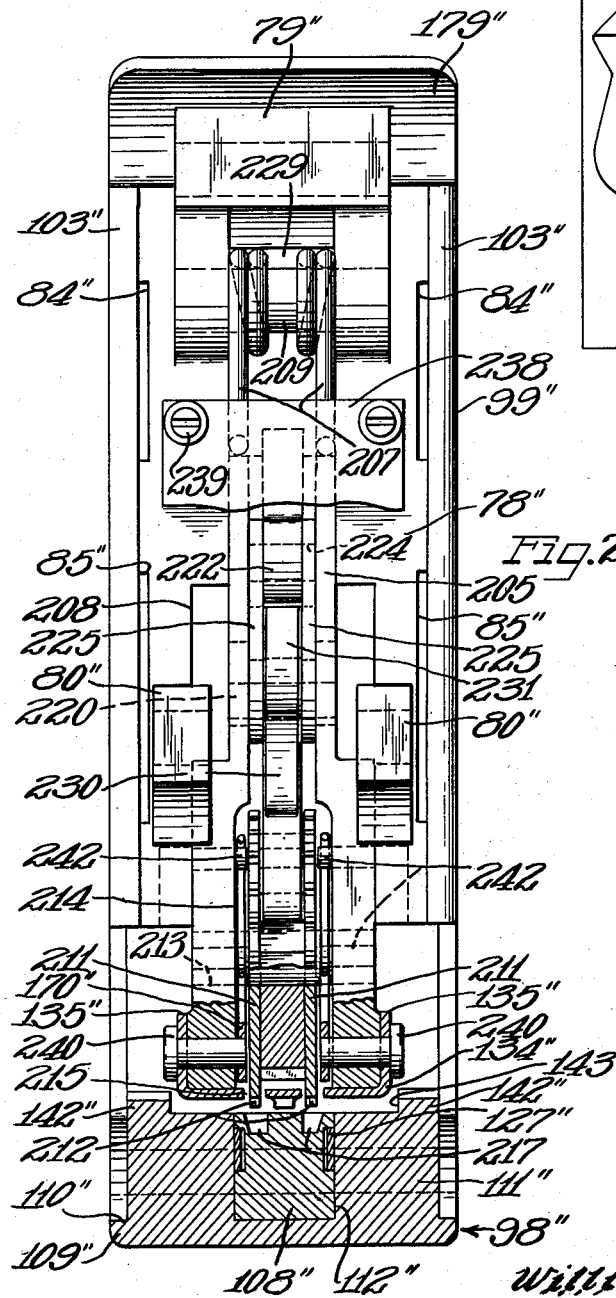
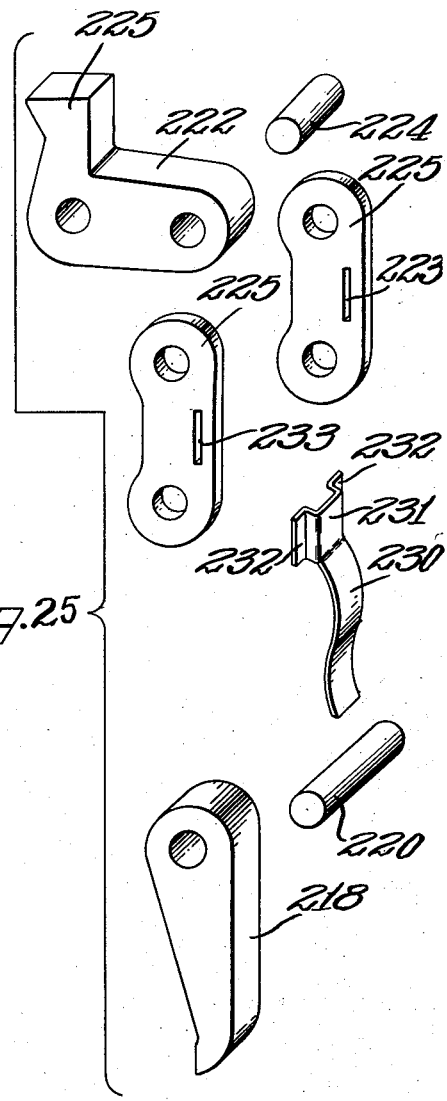
Inventors:
William R. Beckman
Arthur G. Schilke
Charles E. Crooks
by Attys

Patented Sept. 29, 1953

2,653,317

UNITED STATES PATENT OFFICE 2,653,317

HAMMER TYPE STAPLING MACHINE

William R. Beckman and Arthur G. Schilke, Chicago, and Charles E. Crooks, Evanston, Ill., assignors to Spotnails, Inc., Evanston, Ill., a corporation of Illinois Application September 1, 1951, Serial No. 244,806

40 Claims. (Cl. 1—48.1)

The present invention relates to improvements in stapling devices and is more especially concerned with staplers of the manually operable type that have a handle by which the device can be wielded like a hammer to strike against a surface into which a staple is to be driven on impact.

An important object of the present invention is to provide improvements in stapling machines and more especially, though not exclusively, hammer type staplers, of the kind which are subject to rough and hard usage under extreme conditions.

Another object of the invention is to provide an improved stapling machine which is adapted to form and sever and drive staples supplied in flat blanks in a continuous strip.

A further object of the invention is to provide a stapling machine having an extremely short effective driving stroke.

Still another object of the invention is to provide improvements in stapling machines effecting high operating efficiency with an unusually small number of rugged operating parts.

Yet another object of the invention is to provide novel means in a manually operable stapling machine for servicing and loading the same.

A still further object of the invention is to provide improved staple blank feeding means in a stapling machine.

It is also an object of the invention to provide an improved manually operable stapling machine that can be produced economically by mass production methods of manufacture.

Other objects, features and advantages of the present invention will be readily apparent from the following detailed description of certain preferred embodiments thereof, taken in conjunction with the accompanying drawings in which:

Figure 1 is a side elevational view of a hammer stapler embodying features of the invention;

Figure 2 is a top plan view of the stapler;

Figure 3 is a front elevational view of the stapler

Figure 4 is a fragmentary side elevational view of the head end portion of the stapling machine showing the relatively reciprocable head casing and anvil structure partially removed;

Figure 5 is an enlarged vertical sectional view taken substantially on the line V—V of Fig. 1;

Figure 6 is a fragmentary enlarged sectional view taken substantially on the line VI—VI of Fig. 1;

Figure 7 is an enlarged fragmentary elevational detail view taken substantially in the plane of line VII—VII of Fig. 6;

Figure 8 is a schematic perspective view of a strip of sheet metal staple blanks;

Figure 9 is an enlarged fragmentary sectional detail view through the forward portion of the stapling machine taken substantially on the line IX—IX of Fig. 3;

Figure 10 is a sectional detail view similar to Fig. 9 but showing the relationship of parts at the completion of a driving stroke of the machine;

Figure 11 is a fragmentary enlarged elevational detail view of the lower portion of the staple feeding mechanism in association with the anvil at the extreme, overdrive end of a driving stroke;

Figure 12 is a schematic perspective view demonstrating a step in the loading technique for the present machine;

Figure 13 is a fragmentary perspective detail view of the lower portion of the exposed driving head structure of the machine turned upside down to show the manner in which the starting end of a staple blank strip is secured as an incident to loading the machine;

Figure 14 is a fragmentary bottom plan view, partially in section, of the underside or lower end of the driving head and staple feed mechanisms;

Figure 15 is an enlarged fragmentary detail sectional view taken substantially on the line XV—XV of Fig. 9;

Figure 16 is an unassembled top plan view of the striker base and anvil supporting member of the machine;

Figure 17 is a side elevational view of the base and striker member;

Figure 18 is a side elevational view of the anvil block member of the machine;

Figure 19 is a front end elevational view of the anvil block member;

Figure 20 is a fragmentary vertical sectional view taken in an irregular longitudinal plane through the front end portion of a modified hammer stapler according to the present invention;

Figure 21 is a fragmentary sectional detail view taken substantially on the line XXI—XXI of Fig. 20;

Figure 22 is a rear elevational view, partially in section, and with certain parts removed for purpose of clarity, taken substantially on the line XXII—XXII of Fig. 21;

Figure 23 is a fragmentary sectional detail view through the front end portion of a further modified hammer stapler construction according to the present invention and taken in a generally longitudinal vertical plane;

Figure 24 is a rear elevational view taken substantially on the irregular section line XXIV—XXIV of Fig. 23; and Figure 25 is a perspective exploded assembly view of a portion of the feed mechanism of the modified form of Figs. 23 and 24.

While it will be appreciated that certain features of the present invention may have utility in stapling machines generally, whether of the stationary or portable types, principal attention herein is directed to the provision of a compact, efficient hammer stapler of extremely high load capacity and great ruggedness as well as foolproof qualities. More especially, the invention is directed to the provision of a stapler for utilizing flat sheet metal staple blanks 30 (Fig. 8) which are supplied in series in a continuous strip of desired length coiled into a roll 31. Each of these staple blanks 30 is connected to the immediately adjacent blank or blanks by a narrow, readily severable connecting neck 32. Centrally of the coil or roll 31 is a hub or spindle opening 33.

As best seen in Figs. 1, 2 and 3, a hammer stapler embodying the present invention, and capable of being loaded with sheet metal strip staple rolls 31 of 1500 to 2000 blanks, comprises a body portion 34 including a rear handle section 35, an intermediate magazine section 37 and a forward head section 38.

By preference, and for purposes of economy, the body portion 34 comprises a shell made up from a pair of complementary sheet metal sections that can be economically stamped into form and are then assembled and either welded integrally into the complete shell or secured together permanently by means of rivets 39 accommodated within inset portions 40 in the handle section 35, and rivets 41 extending in securing relation between the forward portions of the body shells in the forward part of the magazine section 37. At its rear end the handle section 35 is preferably provided with a downwardly projecting boss or lug 42 serving as an anti-slip stop behind a user's hand, or more particularly behind the little finger of a user's hand. The magazine section 37 is enlarged both vertically and transversely to accommodate the large roll of staple blanks.

One side of the magazine section 37 is provided with an opening 43 (Figs. 5 and 9) large enough to receive one of the staple blank rolls 31 therethrough for loading into the magazine. For reinforcement, the wall of the body casing 34 has an inturned flange 44.

Secured within the magazine section 37 is a staple roll container 45 which is preferably in the form of a generally cup shaped shell of sheet material having the base portion thereof resting against the inside face of the housing wall opposite the opening 43 and with the wall of the container shell of a diameter to fit within the opening 43 as defined by the flange 44. Both the base wall of the container shell 45 and the housing wall against which it rests are preferably bowed outwardly as seen in Figs. 2 and 5 and are provided with complementary inset internested bosses 47 and 48, respectively, secured together as by means of a rivet 49. By preference the bosses 47 and 48 are coaxial with the opening 43, and a tubular hub 50 is mounted by means of a radially outwardly extending foot flange 51 on the inner face of the container shell base wall about the boss 47. By preference the flange 51 is welded or brazed in place. The external diameter of the hub or spindle or mandrel member 50 is such as to fit freely within the central hub opening 33 of one of the staple blank rolls 31 inserted into the magazine. In order to minimize frictional resistance to turning of the staple roll 31 within the magazine container 45, an inwardly projecting transversely arcuate contact limiting rib 53 is provided on the annular wall of the container shell so as to make line contact with the imperforate longitudinal center portion of the outermost coil of the staple blank roll.

At its lower forward portion the annular wall of the container shell 45 is cut out to afford a feed passage 54 (Fig. 9), and the cut out portion of the container wall is fashioned to provide a downwardly and forwardly directed guide lip 55. At its extremity, the lip 55 slants toward and terminates in spaced relation to a forwardly downwardly sloping ramp 57 on the forward bottom wall portion of the housing 34 below and forwardly of the container shell 45 and terminating in a downturned rounded shoulder lip 58. To provide clearance for the feed throat 54 the reinforcing flange 44 and the adjacent portion of the side wall of the housing has a preferably arcuate cut out 59 of sufficient size to facilitate digitally starting the leading end of the staple blank strip from the coil down into the throat and then manipulating the strip onward until it projects beyond the lip 58 of the ramp 57.

For closing the magazine entry or loading opening 43, an openable door or closure 60 is provided (Figs. 1, 2 and 5) which is preferably in the form of a disk of sheet material. To provide rigidity of structure, the closure door or gate member 60 is preferably of outwardly bowed structure and provided with a marginal flange 61 which engages against the wall of the housing 34 surrounding the opening 43, with a projection 62 on the flange 61 to overlap the strip starting clearance recess or cut out 59.

By preference, the closure gate or door 60 is hingedly connected to the housing 34 and for this purpose is preferably provided with an integral hinge extension 63 preferably at the rear side of the cover margin. The hinge extension is of substantial width and is arched outwardly on a radius (Figs. 2 and 6) and then extends inwardly into a hinge slot 64 in the wall of the housing 34 (Figs. 6 and 7). At its inner extremity, the hinge extension 63 has keeper means preferably in the form of a pair of keeper lugs 65 which are originally formed in the plane of the terminal portion of the hinge extension 63 and after insertion through the slot 64 are twisted out of their original plane into planes intersecting the plane of the hinge terminal to prevent withdrawal of the hinge extension terminal. When the cover 61 is to be opened, the arched hinge extension 63 passes freely into the aperture defined by the slot 64 as indicated in dot dash outline in Fig. 6.

At its opposite or forward side, the door 60 is provided wtih an outwardly turned lip-like handle lug 67.

In order to retain the cover 60 releasably in closed position, latch means are preferably provided, in the present instance comprising a resilient latch stud 68 carried by and projecting inwardly from the door 60 and engageable releasably with a keeper annulus 69 carried by the outer end portion of the hub member 50. The latch stud has a rivet head 70 by which it is secured to the door 60 which for this purpose is appropriately apertured. Projecting inwardly the latch stud has a plurality of complementary and cooperative resilient radially outwardly shouldered latch arms 71 which are yieldably projectable under pressure through a venturi-like throat 72 internally of the keeper annulus 69 to engage yieldably and under tension against an internal keeper shoulder 73 which cams the latch arms inwardly and thereby draws the latch stud and the gate or door 60 into snug closed relation. The keeper annulus 69 has an outwardly opening internally tapering entry throat 74 within which the retaining arms or fingers 71 are compressed or stressed toward one another until they pass the restriction 72 and snap behind the camming shoulder 69. Assembled relation of the annlus 69 within the outer end portion of the hollow hub 50 is retained as by means of an interlock rib 75 pressed or spun into a complementary annular groove in the annulus.

It will be noted that the door 60 is located on the right hand side of the stapling hammer. This is advantageous for the reason that most users are right handed and by having the left side of the hammer clear of obstructions or projecting portions, but smoothly finished by the slight side wall bulge of the magazine section, it is possible to get close into reentrant angular places without interference. From Fig. 2, it will be observed, moreover, that the handle has the side walls thereof inset relative to the side walls of the magazine section 37, and this further facilitates getting into close corners.

It should also be observed from Fig. 1 that the lower portion of the magazine section 37 projects substantially downwardly below the lower side of the handle 35. This affords a high degree of protection for the user's knuckles when striking against a surface into which a staple is to be driven.

The stapling hammer of the present invention is so constructed and arranged that the staple driving means are mounted in fixed relation to the handle 35 and the magazine section 37 to take full advantage of a staple driving blow when the stapling hammer is wielded for this purpose. To this end, the head section 38 comprises a head block 78 which is fixedly supported by the housing 34 immediately in front of the magazine section 37. The head block is adapted to be made as a vertically elongated casting and has an upper rearwardly projecting ear 79 and a lower rearwardly projecting ear 80 which extend rearwardly between the side walls of the housing 34 and are secured in place by the transverse pins or rivets 41. Respective spacers 81 (Figs. 9 and 14) maintain the ears or lugs 79 and 80, and thereby the head block 78 in laterally centered relation to the housing 34.

Additional support for the head block 78 is provided by respective opposed upper pairs of forwardly directed strap extensions 82 and respective opposed forwardly extending pairs of lower securing strap extensions 83 (Figs. 4, 9 and 14) on the side walls of the housing and embracing the block 78. For this purpose the sides of the block 78 are provided with respective longitudinally extending slots 84 respective of the upper supporting straps 82 and respective longitudinally extending slots or grooves 85 receptive of the lower supporting straps 83 (see also Fig. 13). The terminal extremities of the several straps are turned angularly inwardly to provide retaining flanges 87 engaging within respective vertically extending rabbet grooves 88 in the forward wall of the block 78. Respective upper and lower connecting pins or rivets 89 securely fasten the straps 82 and 83 to the sides of the head block 78. Thus, the head block 78 is very securely and permanently attached to the front end portion of the housing 34 in a manner that can satisfactorily withstand the stresses and strains and shocks incident to hammering use of the device in service.

At its lower end, the head block 78 extends short of the lower end portion of the ramp 57 and thereby affords substantial passageway for extension and feed of the staple blank strip into forming and driving position under the head block (Figs. 9 and 10).

Supported by and projecting downwardly from the lower forward portion of the head block 78 is a cut-off and driver member 90 and a former 91. Both of these members are preferably formed as enlongated blades of appropriate thickness and preferably of the same width and are mounted within a downwardly and forwardly opening recess 92 in the lower portion of the front face of the head block. The driver cut-off member 90 is preferably longer than the former 91 and is superimposed upon the former and the two members are secured in the recess 92 by means of a stud 93 extending through aligned apertures in the driver and former members and threaded into the head block 78 with the outer end portion of the stud carrying threadedly thereon a lock nut and clamping member 94. A driver slot 95 enables the member 94 to be tightened so that a lateral shoulder engages in the bottom of a suitable counterbore 97 in the face of the cut-off and driver member 90 to secure the members in position.

Cooperatively related to the driving and forming members 90 and 91 is a striker and anvil structure 98 which is reciprocably supported by the head block 78 normally in extended relation to the members 90 and 91 ready for striking against a surface into which a staple is to be driven and then relative movement into operative relation to the driving and forming members for not only cut-off and driving of a formed staple S (Fig. 9) from the leading end of the staple strip but also the forming of the succeeding staple blank 30 into a U-shaped staple S (Fig. 10). To this end, the striker and anvil structure is reciprocably supported by a generally tubular supporting and guide casing member 99 which may be formed from suitable gauge sheet metal into angular hollow cross section dimensioned to engage the head block 78 in slidable vertically guided relation. The front and side surfaces of the head block 78 are formed as vertical, preferably flat bearing surfaces and the supporting and guide member 99 is internally dimensioned complementary to the bearing surfaces. At its front wall the head block 78 provides a vertical bearing surface 100 between the corner rabbet grooves 88. The side walls of the head block are preferably provided with a respective plurality of narrow vertical bearing ribs 101 separated by intervening vertical grooves 102, thereby limiting frictional contact between the side wall surfaces of the block and the relatively slidably cooperating supporting and guide member casing 99.

At its rear side, the casing member 99 is open but is provided at the rear margins of its side walls with inwardly directed angular vertical respective guide flanges 103 (Figs. 10 and 14) slidably engageable behind rearwardly directed respective bearing shoulders 104 on the head block and with the respective attachment strap extensions 82 and 83 appropriately complementarily indented to provide clearance grooves 105 (Figs. 4, 13 and 14). Through this arrangement, free vertical relative sliding, reciprocal movement of the head block 78 and the guide casing 99 is permitted within operative limits, and also assembly of the casing member 99 by relative sliding movement with respect to the head member is facilitated.

The striker and anvil structure 98 may, if desired, be constructed in one piece, but for economy in manufacture is preferably made in two parts comprising a striker and anvil supporting base block 107 and an anvil block 108 assembled therewith. As best seen in Figs. 9, 15, 16 and 17, the striker and base block 107 comprises a preferably flat base plate portion 109 front and side marginally dimensioned to engage against the lower edge of the casing member 99 a marginal flange 110 being provided for this purpose. At its forward edge the flange 110 is preferably contoured to extend beyond the forward wall of the casing member 99 as a buffer nose.

Adjacent to the opposite sides of the base plate 109 are respective upwardly projecting preferably parallel body block portions 111 defining a longitudinal anvil block channel 112 therebetween within which the anvil block 108 is received snugly in assembly. For this purpose the anvil block 108 is of elongated narrow form complementary in width to the channel 112. In the assembly, the base member 107 and the anvil block 108 are secured together and to the lower end portion of the casing member 99 by means such as connecting pin rivets 113 extending through complementary, aligned pin apertures 114 and 115 in respectively the body block members or portions 111 and the anvil block 108 aligned with similar apertures 117 in the sides of the casing member 99 and within which the heads of the rivet pins are peened or upset to effect a functionally integral assembly.

The construction and relationship of the striker and anvil assembly 98 is such that in each operative stroke of the stapling hammer the driver 98 severs a formed staple from the leading end of the staple blank strip and drives the staple while the former 91 forms the succeeding staple blank into staple form. Accordingly, the forward end portion of the anvil member 108 extends forwardly beyond the front ends of the body block and anvil centering portions 111 a sufficient distance to cooperate with the driver 90 by providing a shearing or cut-off edge 118 cooperative with the rear shearing edge of the cut-off and driving member 90 in a driving stroke to sever the neck connecting the formed staple with the staple blank strip. Rearwardly from the shearing edge 118 but forwardly of the front ends of the side supporting body portions 111, the anvil member 108 cooperates with the staple former 91 which for this purpose has a generally U-shaped downwardly opening for mean slot 119 dimensioned to pass by the sides of the forwardly projecting portion of the anvil member 108 to engage and bend down about the anvil member the staple leg or arm portions of the next succeeding staple blank, which legs move down in the space forwardly of the body portions 111.

To delimit the forward position of not only the formed staple blank at the terminus of the staple blank strip, but also the next succeeding blank, the supporting and striker block 107 carries forwardly of the body portions 111 respective generally complementary upstanding limit stop standard or post members 120. These are disposed at respectively opposite sides of a staple exit opening 121 in the base plate 109 and provide respective vertical stop faces 122 for delimiting forward movement of the formed staple S while defining therebetween a space for the severed neck stub at the forward side of the staple. Spaced rearwardly from the stop shoulders 122 are respective stop shoulders 123 which oppose the ends of the body portions 111 and prevent overrun of the staple strip by opposing the forward edges of the laterally projecting legs or arms of the next succeeding staple blank in the forming space at the sides of the anvil block.

Immediately rearwardly of the stop shoulders 122 tapered or curved lead in cam surfaces 124 are provided on the respective stop standards 120 and complementary to one another and directed toward the exit opening 121 for positively camming the tips of the staple S when driven toward and through the opening 121. It will also be noted that the forward end of the anvil member 108 is tapered downwardly and rearwardly as indicated at 125.

In order to provide backlash preventing means for the staple strip and also to restrain the staple legs against rearward tilting during severance of the staple from the strip, novel means are provided, herein comprising resilient back up members 127. In a practical form these members comprise elongated bowed resilient leaf springs preferably formed from tempered spring material. To accommodate the spring members 127, the anvil 108 is provided with respective longitudinal grooves 128 at its opposite sides and intersecting the upper portions of the pin apertures 115 (Figs. 9, 18 and 19). The grooves 128 are deeper than the thickness of the spring members 127 but are shallower than the unstressed bowed arc of the spring members. In assembly the spring members 127 are inserted in the grooves 128 and stressed toward flattened condition therein with the backs of the bowed springs within the grooves and bearing against the anvil block. Then the anvil block is assembled within the channel 112 so that the inner walls defining the body portions 111 confine the spring members 127 in their stressed condition within the grooves 128. Longitudinal displacement of the leaf spring members is prevented by engagement of the leaf spring members with the securing rivet pins 113, for which purpose the spring members are appropriately complementarily notched as at 129.

The forward end portions of the restraining spring members 127 extend forwardly alongside the forwardly projecting portion of the anvil member 108 and to a limited extent beyond the forward tip of the anvil member sufficiently to flare out laterally and engage behind the respective legs of the formed staple in the staple driveway and more especially against the rear edges of the legs. The arched or bowed condition of the restraining spring members 127 is properly calculated so that with the forward portions of the spring members spread against vertical corner shoulders 130 provided at the forward ends of the body portions 111 at the anvil grooves 128, the spread apart forward tips of the spring members will properly engage behind the rear edges of the staple legs. At their rear tips, of course, the spring members 127 engage under stress or tension against the side walls of the body portions 111 closing the anvil grooves 128. By reason of the resilient flexibility of the spring members 127, the forward tip portions can flex into the forward portions of the anvil grooves 128 as an incident to forming of the staple legs at the opposite sides of the anvil nose portion. Then, when the staple blank strip is fed forwardly the forward tip portions of the spring members will snap open and into stop or restraining position behind the staple legs.

The construction and arrangement of the striker and anvil structure 98 and the supporting tubular casing 99 and the relationship thereof to the head block 78 are such that the striker and anvil structure 98 normally projects downwardly a substantial distance below the lower end of the ramp 57 (Figs. 1 and 9) to a sufficient extent to clear the cut-off and staple-forming members 90 and 91 above the anvil 108 for feeding of the staple blank strip into position between the anvil block and the forming, cut-off and driving members, and further, such that at the completion of a driving stroke the lower surface of the striker member base plate 109 will be in a plane under the ramp lip 58. To this end, in the form of the invention shown in Figs. 9, 10 and 14, the lower or cut-off and driving tip of the member 90 is disposed to extend to a lower elevation than the ramp lip 58 and the striker and anvil structure is normally biased to extend downwardly into clearance relation to the cut-off and driver tip as best seen in Fig. 9.

Efficient biasing means comprises a spiral compression spring 131 mounted within a vertical downwardly opening bore 132 in the head block 78 and bearing under compression against a biasing plunger 133 reciprocally slidably guided in the bore 132. At its lower end the plunger 133 carries a biasing shoe 134 which normally bears down against the anvil 108.

By preference, the shoe 134 performs, in addition to its biasing function, the functions of a staple strip guide means, a staple strip hold-down lever, and a staple strip flattening means. To this end, the shoe member 134 (Figs. 9, 10 and 14) preferably comprises a suitable gauge sheet metal member having spring characteristics and provided with spaced parallel upstanding ears 135 which engage the lower end portion of the plunger 133 within respective recesses 137 and are connected to the plunger by means such as a rivet pin 138. Thereby the shoe member 134 is secured in engagement with the lower end of the plunger 133 which engages against the upper surface of the body of the shoe.

At its forward end portion, the shoe member 134 is constructed to provide a resilient strip hold down spring lever. To this end the forward end portion of the shoe member comprises an elongated narrow spring finger extension 139 normally extending slantingly downwardly and forwardly and terminating in a substantially flat horizontal hold down pad 140 which is disposed to engage upon the upper surface of the central portion of the staple blank strip on top of the forwardly projecting forming nose portion of the anvil 108. Thereby, the biasing pressure of the shoe 134 is exerted effectively upon the anvil 108 under the forming member 91 and serves the further desirable function of a stripper to assure stripping of the formed staple blank from the former.

At its rear portion, the shoe member 134 is provided with a rearwardly and upwardly curving strip deflector and guide tail 141 which extends rearwardly and upwardly relative to the lower end portion of the plunger 133 and normally in the extended condition of the hammer head assembly lies in spaced opposition to the forward edge of the throat lip 55 and the ramp lip 58 to guide the staple blank strip smoothly toward the forming and driving station between the hold down finger extension 139 and the anvil 108.

Strip guiding assistance, cooperative with the shoe 134 is afforded by upstanding curbs 142 provided along the outer longitudinal margins of the striker and supporting body portions 111 to project upwardly above the preferably common plane of the top of the anvil 108 and the tops of the body portions 111 inside the curbs 142. There is thus provided a guideway above the anvil down into which the shoe 134 normally constantly projects as best seen in Fig. 9. By preference the curbs 142 have forwardly convergently tapering guide walls 143 (Fig. 16) to accommodate the staple strip with minimum resistance from engagement with the tips of the staple blank legs.

When a staple is to be driven, the hammer stapler is wielded like an ordinary hammer to drive the flat bottom of the striker plate 109 against the surface into which a staple is to be driven. The flat bottom of the plate 109 thereby comes to rest upon the surface and inertia carries the driving head 78 downwardly toward the striker and anvil assembly 98, compressing the biasing spring 131 and carrying the cut-off and driver member 90 and the staple forming member 91 downwardly into operative relation to the anvil 108 and further until the leading end staple has been driven into the impacted surface and the next staple blank formed into the staple shape, substantially as seen in Fig. 10 which shows the relationship of parts just short of the final increment of movement in the driving stroke. It will be clear, of course, that as the spring 131 is compressed, correspondingly greater pressure load is exerted against the shoe member 134 through the plunger 133 so that the hold down and pressure finger 139 gradually flexes resiliently toward flattened condition. Then, as best seen in Fig. 11, at the conclusion of the driving stroke there is a slight overdrive which causes the shoe member 134 to spank against a plurality of the successive staple blanks 30 behind the newly formed terminal staple S. As a result the end portion of the strip including several of the staple blanks 30 is quite effectively flattened against the anvil 108 and all surface irregularities or kinks that may possibly be present in the strip and which might cause disruption of proper functioning of the mechanism are thoroughly ironed out. Immediately upon dissipation of the driving blow energy, the spring 131 expands and returns the mechanism to the initial relative position of the parts, in readiness for another staple driving and forming blow.

As an incident to the staple driving and return strokes of the head mechanism, means are operated for feeding by one staple increment forwardly so that the newly formed staple is advanced into the driving throat of the device automatically as an incident to return of the mechanism to the initial position. To this end, a yoked feed finger member 144 (Figs. 9, 10 and 14) is provided which has a pair of identical feed fingers 145 directed forwardly above the forward tip portion of the anvil 108 and is pivotally connected as by means of a connecting pin 147 to the lower end portion of a feed lever 148 which extends upwardly within a downwardly opening slot 149 in the plunger 133 and is rockably connected adjacent to its upper end within said slot by means of a connecting pin 150. A yoke-type torsion spring 151 has the yoke end portion thereof engaging against the flat yoke portion of the feed finger lever member 144 and has torsion arms thereof engaged about appropriate laterally projecting trunnion-like anchoring pins 152 at opposite sides of the lever 148. The spring 151 acts not only to bias the feed finger lever 144 downwardly into feeding engagement relative to the anvil member and the staple blank strip, but also acts normally to effect a forward bias of the lower portion of the feed lever 148 due to the torsional relationship whereby the lowermost of the engagement pins 152 is engaged within the forwardly opening reentrant angle of the spring legs and the uppermost of the connecting pins 152 is engaged by the terminal portions of the spring legs while the spring is tensioned to tend normally to straighten out from the angled relationship shown in Fig. 9.

As the mechanism approaches the staple driving portion of the driving and forming stroke, a plunger 153 slidably reciprocably guided in a bore 154 in the head of the plunger 133 has the upwardly projecting end thereof engaged by a downwardly directed head 155 of an adjustable abutment stud 157 carried by the upper end portion of the head block 78 and projecting downwardly into the bore 132 within the biasing spring 131. As the upper end of the plunger 153 engages the fixed stop head 155, and is thereby halted in upward movement, a head 158 on the lower end of the plunger 153 normally engaging against a rounded head 159 at the upper end of the lever 148 forwardly of the pivot or rocking axis of the lever, causes the lever 148 to swing positively about the axis of its pivot 150 to carry the lower end portion thereof rearwardly and thus move the feed finger member 144 likewise. Thereby the feed fingers 145 are drawn back behind the newly formed staple blank S in readiness to feed the same forwardly into driving position at the completion of the return stroke of the mechanism.

In view of inevitable manufacturing tolerances and other factors which make it desirable to adjust the feed rocking stroke of the lever 148, the abutment stud 157 is preferably adjustably mounted. For this purpose the stud 157 is threadedly secured in a bushing member 160 secured within a bore 161 in the top of the block member 78. By preference the bushing 160 is centered with relation to the axis of the plunger 133 and has a flange 162 that serves as a seat for the upper smaller end of the spiral compression biasing spring 131, and also seats in thrust relation against the roof of the bore 132.

For adjustment purposes, the upper end of the stop stud 157 is provided with means such as a slot 163 for effecting threaded adjustment thereof by means of a screwdriver or the like. Proper adjustment is effected on the assembly bench. Once the proper adjustment has been found for the assembly, the stud 157 need not be further adjusted. Therefore means are provided to immobilize or neutralize the adjustment and also to lock the adjustable stud 157 against tampering. To this end the relationship is such that a substantial cavity is provided within the bushing 160 above the end of the stop stud 157 after adjustment has been effected and this cavity is filled with a sealing material such as solder 164. Solder or a similar material can be readily removed by the application of heat to melt the same if it becomes necessary, due to repairs or wear to service the machine and effect a new adjustment.

In order to assure clearance of the feed fingers 145 from the path of the driving and cut-off member 90 at the commencement of a driving stroke, the forward edge of the feed lever 148 is provided with a cam surface 165 against which the inner end or tip of the adjustable stud 93 engages to drive the lower end portion of the lever 148 rockably inwardly a limited initial distance. For adjustment the stud 93 is threadedly secured into the forward portion of the head block 78, with its inner end or tip appropriately adjusted with respect to the particular requirements of the rockable feed lever 148.

At the end of a return stroke of the mechanism, the feed lever 148 is positively rocked in the feeding direction by engagement of an overhanging upper end forwardly projecting finger 167 thereon against an abutment provided by a bar or pin 168 which traverses the bore 132 above the abutment and booster pin 93. The bar 168 functions also to retain the plunger 133 against turning in the cylindrical bore 132, and the plunger therefore has a forwardly opening clearance slot or cut-out 169 providing vertical bearing surfaces which normally clear the bar 168 but will engage the same on any tendency of the plunger 133 to turn out of position.

From Fig. 9 it will be observed that the feed thrust or booster bar 168 and the stud 93 are cooperatively related to retain the feed lever 148 against centrifugal forward rocking during a driving stroke and also against any tendency to rock backwardly for any reason. By having the tip of the stud 93 engage the lever below its pivotal or rocking axis forward swinging of the lever is positively limited. By having the finger 167 engage the thrust bar 168 at the end of the feed stroke, rearward inadvertent movement of the lever is prevented.

It has also been found in practice that if for any reason a staple has not been fully driven during a driving stroke, it can be hammered home by driving the substantial rearward striking surface of the striker plate 109 thereagainst. Sufficient force for such supplemental driving of a partially driven staple can be generated without driving the next succeeding staple or disrupting the feed mechanism. Thereby the hammer has proved to be substantially jam-proof.

For air pressure relief, the upper portion of the bore 132 is vented through an opening 169 which preferably opens to the interior of the magazine section 37.

Loading of a fresh staple blank strip into the head section 38 is accomplished simply by sliding the carrying and guide casing 99 off of the head block 78, as indicated in Fig. 4 to expose the lower end portion of the driving mechanism substantially as shown in Fig. 13. It will be assumed that a fresh roll 31 of staple blanks has been placed in the magazine section 37 and the end portion thereof projected from the feed throat 54 into position opposite the shoe member 134. Then, by supporting the machine in the inverted position shown in Fig. 13, the end portion of the staple blank strip is grasped between the forefinger and thumb of one hand, substantially as shown in Fig. 12 and the leading or terminal staple blank 30 is hooked in front of a pair of loading lever fingers 170 and behind respective loading shoulders 171 at the back of the feed fingers 145, in the manner shown. The loading fingers 170 are preferably provided on a generally yoke-shaped finger lever member similar to the feed finger member 144 but shorter and pivotally mounted at its rear end portion upon the pin 138 by which the ears of the shoe are connected to the bottom portion of the plunger 133. A torsion spring 172 wound about the pin 138 operatively engages at its forward end with the forward end portion of the loading finger lever member and at its rear end portion bears against the rear end portion of the shoe 134. By the operation of the spring 172, the loading finger lever is normally biased downwardly as shown in Fig. 9 and upwardly as shown in Fig. 13 into a position where it will not interfere with normal operation of the feed finger lever member 144. In the loading position, the spring 172 biases the loading finger 170 to shoulder at 173 against the shoe member 134 to assume the loading position wherein the forwardly slanting forward edges of the loading fingers 170 are in position to hook behind the rear edges defining the legs of the terminal staple blank 30, while the shoulders 171 of the feed fingers engage under the bias of the spring 151 firmly against the forward edges defining the terminal staple blank legs. As a result, the terminal blank of the staple strip is quite firmly held until the casing member 99 is reassembled with the head block 78 and the assembly completed, ready for operation. In this retained position of the terminal staple blank, it is properly located to be formed upon the initial driving stroke. Then, of course, it is automatically fed forward so that on the succeeding stroke the staple will be driven and the next succeeding staple blank formed into the staple shape.

Because of the firm grip of the staple strip by the hold down pad 149 of the biasing shoe 134, as well as the retraction preventing function of the spring members 127, no additional hold back means is required, but the loading fingers 170 are so located, as best seen in Fig. 9 that they serve as emergency hold back fingers should the need arise. Normally, however, the loading fingers 170 are idle during normal operation of the machine.

In order to enable the machine to utilize staple blank strips of various widths, the feed fingers 145, and preferably also the loading fingers 170 are constructed to serve as centering means for the staple strip. To this end, having particular reference to Fig. 14, the feed fingers 145 and the loading fingers 170 are respectively divergently related straddling the hold down finger 139 to engage the opposite sides of the necks between staple blanks cammingly to center the strip longitudinally in the guideway over the anvil 108 and under the shoe 134.

Releasable means are provided for retaining the casing member 99 in operative relation on the head block 78 in the non-operating or fully extended condition of the striker and anvil structure 98 relative to the driving end of the head block 78. To this end a releasable head latch member 174 is mounted on the upper or head end portion of the casing member 99 for closing the normally open end of the casing member. By preference the latch member 174 comprises a sheet metal stamping of appropriate gauge (Figs. 1, 2, 3, 4 and 9) which is of a width to seat closingly upon the upper ends of the side walls of the casing member 99 and has the forward end portion provided with a hinge curl 175 hingedly connected by a pin 177 to and between a pair of forwardly projecting spaced parallel hinge ears 178 struck out from the upper portion of the front wall of the casing member 99. At its rear end portion the latch member 174 has an upwardly directed lip-like handle 179.

Means for releasably securing the latch gate member 174 in position comprise in the present instance a pair of upstanding ears 180 respectively provided on the upper edges of the casing member 99 and projecting through respective slots 181 in the member 174 and closely dimensioned with respect to the ears 180 in width while amply clearing the same at the ends of the slots. The ears 180 have transversely aligned holes 182 therein receptive of releasable locking pin structure comprising respective locking pins 183 formed integrally in one piece with a resilient locking pin member 184 carried on top of the latch gate plate 174. Journal straps 185 struck up from the top of the latch plate 174 provide journals or sockets for the pins 183 aligned with the openings 182. The member 184 is yoke shaped and dimensioned longitudinally to lie against the upper face of the latch plate 174 between the straps 185 and with the connecting yoke portion thereof complementary to and lying against the handle portion 179 of the latch member. Extending forwardly and connecting the yoke portion of the member 184 with the pin members 183 are respective digitally engageable loops 187.

The member 184 is formed from resilient material such as appropriate gauge spring wire and is resiliently deflectable by compressing the loops 187 toward one another for withdrawing the pin portions 183 thereof from the ears 180 to release the member 174. The spacing between the legs of the yoke of the member 184 is predetermined to limit withdrawal of the pins 183 to the extent necessary to release the same from the ears 180 but not from the straps 185. To effect relocking of the latch member 174, it is returned to the locking position and the pins 183 returned to the locking relation with the ears 180.

In addition to serving as locking ears, the ears 180 serve also as form retaining means for the upper portion of the casing member 99 and more particularly the side walls thereof since by the interengagement of the ears 180 through the closely fitting slots 181, spreading of the side walls of the member 99 is substantially precluded in the upper portion thereof in service. The lower portions of the side walls of the member 99 are, of course, retained firmly in position by the connecting rivet pins 113.

In the modification shown in Figs. 20, 21 and 22, the principal difference over the form of the invention that has just been described resides in the driving head portion of the machine. The basic mode of operation and structure are substantially the same in this modification as in the first-described form. Therefore identical or substantially identical parts of this modification will be identified by primed reference numerals corresponding to the same reference numerals of the first-described form and specific description of the corresponding elements or parts will be dispensed with for the sake of brevity. It will be understood, however, that the cooperative relationship and function of the parts identified by primed reference numerals is the same as described in connection with the first-described form of the invention except as modified by the immediately following description.

The principal difference in the modification of Figures 20 to 22 resides in the modified arrangements for biasing the striker and anvil assembly and for incrementally feeding the staple strip into forming and cut-off and driving position, and without the use of a biasing and feed mechanism supporting plunger as in the first-described form of the invention. To this end, biasing of the striker and anvil structure 98' and the supporting and guide casing 99' normally into extended position to the extent permitted by the top closure member 174' is effected by means such as elongated, narrow respective coiled compression springs 188 disposed at the opposite sides of the head block 78'. The biasing springs 188 are accommodated in vertical position throughout approximately half their diameter within respective vertical clearance grooves or channels 189 in the sides of the head block 78', and throughout the remainder of their diameter within laterally protruding vertical interiorly hollow respective bosses 190 provided in the side walls of the casing member 99'. At their upper ends the springs 188 bear against respective downwardly facing thrust shoulders 191 provided at the upper ends of the respective grooves 189 in the head block. At their lower ends, the springs 188 thrust under compression load against respective thrust shoulders 192 provided at the lower ends of the bosses 190 of the casing member. Through this arrangement, the casing member 99' and the striker and anvil structure 98' supported thereby are normally biased toward the maximum extended condition relative to the head block 78' but will yieldably move reciprocably relative to the head block 78' in response to a staple driving and forming blow of the striker 107' against a surface into which a staple is to be driven.

The feed lever 148' is supported reciprocably within the head block 78' directly within a vertical rearwardly opening clearance slot 193 in the head block. This is accomplished by mounting the lever 148' upon a pivot pin or shaft member 194 which is freely vertically movable through a transverse slot 195 in the head block 78' and elongated vertically to afford a full range of vertical reciprocal movement of the lever 148' with the anvil and striker structure 98'. The opposite end portions of the rocker shaft or pivot pin 194 extend through the respective opposite side walls of the casing member 99' and are held in assembly against endwise displacement by means such as split snap ring washers 197 fitting in suitable annular grooves in the end portions of the shaft. Thus, as the casing member 99' moves reciprocably relative to the head block 78' the feed lever 148' is carried correspondingly reciprocably within the slot 193 in the head block between the full line and dot-dash line positions shown in Fig. 20.

At the end of a driving stroke of the mechanism, the head 159' of the feed lever engages against the lower end or tip of a fixed stop stud member 198 which corresponds in function to the plunger 153 and the abutment stud 157, previously described. The abutment stud 198 is disposed on an axis offset forwardly from the pivotal axis of the lever 148' appropriately to effect rearward swinging of the lower portion of the lever 148' at the completion of a driving stroke of the device. For this purpose the stud 198 is threadedly secured adjustably through a vertical threaded bore 199 in the top portion of the head block 78', with adjustment effected through the top of the head block in the same manner as adjustment of the stud 157 is effected, and similar adjustment-retaining and anti-tampering means may be provided after bench adjustment has been attained.

Support for the hold down and guide shoe 134' and for the loading fingers 170' is provided by the striker and anvil supporting block body member 107'. To this end, the side portions 111' are provided with upstanding intermediate respective bosses 200 providing end support for the supporting pin 138' for the connecting ears 135' of the shoe member 134' and for the loading finger member as well as for the biasing spring 173'. The pin 138' is, of course, somewhat longer than in the first-described form of the invention. To hold the shoe 134' against rocking about its support, the ears 135' are preferably provided with respective outwardly directed front and rear interlock tabs or extensions 201 engaging within respective rabbet grooves 202 in the front and rear edges, respectively, of the bosses 200. Thus, instead of riding with the feed finger and lever assembly, the shoe 134' and the loading finger member ride with the striker and anvil support member 107'. However, the feed, hold-down shoe and loading finger mechanism are actually all supported to move with the casing member 99' in operation. It will be noted that respective spacer sleeves 203 are provided between the shoe supporting ears 135' and the loading finger member to maintain the latter in centered relation. Since the feed fingers 145' straddle the loading fingers 170' the feed finger member 144' is also maintained in centered relation.

To facilitate loading of the machine with a staple blank strip from a coil within the magazine section 37', the lower portion of the housing at the strip delivery throat 54' and at the rear portion of the ramp 57' is provided with a clearance cut-out 204 so that the end portion of a staple blank strip can be grasped between the thumb and a finger of a hand of the user and pushed forwardly between the shoe member 134' and the anvil member 108' until the leading staple blank has passed the loading fingers 170'. The machine is then ready for continuous and repeated use until the staple strip has been completely used up.

Should it be necessary for any reason to disassemble the head portion of the machine, that can be quickly effected by releasing the rock shaft or pin member 194 and withdrawing the same, whereupon the casing member 99' can be slidably separated from the head member 78' after opening of the latch member 174'.

In the modification shown in Figs. 23, 24 and 25, a ratchet and star wheel feed arrangement is shown for advancing the staple blank strip. Inasmuch as the general mode of operation and the housing and head structures, including the magazine section, the head block structure and the reciprocable striker and anvil structure are in several respects identical and in certain respects substantially the same as in the first-described form of the invention, corresponding elements have been identified by double primed similar reference characters and it will be understood that the elements thus identified have the same functions in both forms of the invention.

A normal extended relation of the striker and anvil structure 98'' and the slidably guided casing member 99'' with respect to the head block 78'' is maintained by biasing means including an elongated plunger 205 of generally rectangular cross section urged into the extended relation by a pair of torsion springs 207 acting between the head end of the plunger and the roof of a guide slot 208 within which the plunger is vertically reciprocably guided slidably in the head block 78″. The springs 207 are of the type having torsion arms extending from a loading coil, and one arm of each spring thrusts against the upper end of the plunger while the other arm thrusts against the roof defining the slot 208. A transverse pin 209 supports the springs 207 at the coil portions thereof.

At its lower end the plunger 205 carries the shoe member 134″ and which bears down against the anvil 108″ within the staple strip guide channel 143″.

At each operating stroke of the mechanism a star wheel feed mechanism 210 advances the staple blank strip by one staple blank 30″ toward the cut-off and driving member 90″ and the staple forming member 91.″ To this end, the star wheel feed mechanism 210 includes a pair of preferably identical star wheel feed members 211 having staple blank engaging and advancing lugs or teeth 212 projecting uniformly peripherally and disposed in transverse alignment as the star wheel members are coaxially pivotally mounted on a pivot pin 213 extending transversely through the lower portion of the plunger 205 so that the star wheel assembly is rotatably mounted within a slot 214 in the plunger. The mounting of the star wheel assembly is such that the lower portion of the peripheries of the star wheel members 211 project down through respective slots 215 provided longitudinally to accommodate the same in the shoe member 134″. Thereby the lugs 212 on the star wheel members are engageable between successive ones of the staple blanks 30″. It will be observed that in order to provide clearance for the star wheel feeder lugs 212 in the final phase of the driving stroke, and more especially during the spanking overdrive terminal portion of the stroke, the top of the anvil 108″ has a spaced pair of clearance grooves 217 therein.

Incremental staple blank advancing rotation of the star wheel feed mechanism 210 is effected by means of a feed pawl 218 operatively engageable with successive teeth on a ratchet wheel 219 disposed fixedly and coaxially between the two star wheels 211. The pawl member 218 is in the form of an elongated lever which is freely pivotally mounted on a pivot pin 220 that extends through the upper or butt end of the pawl and is vertically reciprocably guided within aligned slots 221 in the walls of the plunger 205 defining the slot 214 so that the pawl may have an adequate range of vertically reciprocal movement for successive engagement by its depending ratchet-engaging tip with the ratchet teeth of the ratchet member 219.

Reciprocations of the pawl 218 are effected automatically in the operation of the stapling hammer by means of a bell crank member 222 which is pivotally mounted on a pin 223 within the upper portion of the slot 214 of the plunger and has an arm extending rearwardly into pivotal connection by means of a pin 224 with a pair of preferably identical links 225 extending down into pivotal connection with the pawl 218 through the medium of the pivot pin 220.

Near the end of a driving stroke of the machine, an upwardly extending arm or head 227 on the forward portion of the bell crank member 222 engages a camming head 228 projecting downwardly from an adjustable stud 229 threaded into the top of the head block 78″ and accessible for adjustment from on top of the head block. This causes the bell crank 222 to be rocked counterclockwise about its pivot 223, as seen in Fig. 23 and this draws the links 225 and thereby the pawl 218 upwardly. The adjustment of the camming head 228 is such that upward movement of the pawl 218 is sufficient to clear the next succeeding tooth on the ratchet member 219 so that a pawl biasing spring 230 will snap the driving tip of the pawl into engagement with the next succeeding ratchet tooth.

In a convenient form, the pawl biasing spring comprises a resilient leaf spring having a head portion 231 provided with lateral oppositely directed coplanar flanges 232 which are received in assembled relation within respective complementary vertical slots 233 in the links 225. Thereby the spring 230 is carried by the pawl actuating lever and link mechanism and constantly biases the pawl toward the ratchet by engagement with the back of the pawl below its pivot.

Staple blank advancing thrust is imparted to the pawl 218 at the end of the return stroke of the driving head mechanism, and more particularly at the end of the return stroke of the plunger 205 under the bias of the spring 207. To this end, an abutment stud 234 is threaded through the front wall of the head block 78″ above the recess 92″ to position a rounded tip 235 on the inner end of the stud for engagement by a cam face 237 on the forward side of the bell crank head 227. Thereby, when the plunger 205 returns to the fully extended relation thereof to the head block 78″, the cam face 237 engages the abutment tip 235 and causes the bell crank member 222 to rock clockwise as viewed in Fig. 23 for driving the links 225 and thereby the pawl 218 downwardly for advancing the star wheel mechanism by one ratchet tooth increment which is properly calculated to advance the staple blank strip one staple blank forwardly.

Serving as a retainer for the upper portion of the plunger 205 and as a partial closure for the rear, open side of the slot or plunger guideway recess 208 in the head block 78″, is a plate 238 which may be secured as by means of screws 239 across the upper portion of the slot 208 in clearance relation below the springs 207. The lower portion of the plate 238 is offset outwardly to clear the pawl biasing spring 230. Additional retaining bearing means for the plunger 205 and disposed adjacent to the lower end of the plate 238 are provided by inwardly extending bearing portions of the attachment ears 80″, as best seen in Fig. 24.

Loading of a new staple blank strip into the machine of Fig. 23 is effected by removing the casing member 99″ with the anvil and striker structure 98″, after opening the closure member 174″. Thereupon the end of a new staple blank strip fed down the feed throat 54″ is engaged upon the strip feed star wheel 212 and held in place by the loading fingers 170″ engaging behind the terminal staple blank 30″. During loading, the thrust of the plunger-engaging legs of the biasing springs 207 is absorbed by the upper edge of the guide and closure plate 238, serving as a loading thrust immobilizing abutment for the spring legs. The relationship is such, however, that when the striker and anvil mechanism 98″ and the supporting and guide casing 99″ are replaced upon the head block 78″ and the latching closure member 174″ is replaced, the plunger 205 is sufficiently retracted by thrusting against the striker and anvil assembly to maintain the biasing springs 207 under compression by stressing the plunger-engaging legs of the springs out of the inactive abutment thereof against the upper edge of the plate 233. A forwardly opening clearance slot or recess 205a in the front edge of the slide or plunger 205 has a retaining pin 205b therethrough for avoiding accidental dropping out of the plunger during loading.

The loading fingers 170'' are pivotally carried by the lower end portion of the plunger 205 within the lower end portion of the slot 214 and in straddling relation to the feed wheel assembly 210. To this end, the loading fingers are pivotally supported at their rear end portions by the inner end portions of connecting and pintle pins 240 which not only secure the ears 135'' of the presser shoe against the outer sides of the plunger 205 but also have their inner ends in supporting pintle relation to the loading finger pivot portions.

A yoke-type torsion spring 241 normally biases the forwardly projecting loading fingers 170'' toward the anvil 108''. The spring 241 has angular legs supported upward respective pins 242 which project into appropriate spring clearance space within the slot 214 of the reciprocal plunger at the sides of the feed wheel assembly 210.

Attachment of the cut-off and driver member 90'' and the forming member 91'' within the recess 92'' of the head block is effected by a headed stud screw 243 the inner end of which extends clear of the proximate forward wall defining the guideway recess 298 in the head block.

In all forms of the invention the reciprocably slidable striker and anvil assembly including the guide casing, as a unit, provides a readily removable head piece not only for loading purposes but also for purpose of inspection of the mechanism and for cleaning out any accumulated foreign matter such as wool, tobacco, or other material that may be lodged therein as a result of carrying the unit in the pocket of a coat or the like. Staples of various lengths throughout a substantial range can be effectively formed and driven by any of the modifications of the invention by reason of the novel staple blank strip centering and retaining mechanism. For example, three-eighths inch, five-sixteenths inch and one-quarter inch staples can be accommodated in the same machine. In view of the powerful direct, two-way rectilinear staple driving thrust effected by relative movement of the striker and anvil structure and the head block structure during a cut-off and driving stroke, extremely short travel of the cut-off and driving member is effective. In a practical form, movement of as little as three-thirty-seconds of an inch of the cut-off and driving member relative to the anvil effects severance of the formed staple from the staple blank strip, and overall movement of about nine-sixteenths inch of the cut-off and driving member relative to the striker portion of the device effects full driving of the staple.

By reason of the small number of relatively movable parts in the driving head portion of the hammer stapler, highly rugged characteristics can be built into the machine without overweighting the head portion. Furthermore, the various parts can be economically mass produced with substantial manufacturing tolerances, and yet by reason of the novel feed mechanism adjustments and controls, practically foolproof, jam-free long-service operation of the stapler are assured. By virtue of the small number of easily assembled, and fairly simple parts, substantially free from highly critical dimensional tolerances production costs are minimized and the stapling hammer can be produced and sold at very reasonable cost.

It will be understood, of course, that in the modifications of Figs. 20 and 23, the handle and magazine sections may be substantially identical with the showing in Fig. 1.

It will be understood that modifications and variations may be effected without departing from the scope of the novel concepts of the present invention.

We claim as our invention:

1. In combination in a hammer stapler a manually engageable handle section, a driving head section, a magazine section between and connecting said driving head section to the forward end portion of the handle section, said driving head section having a staple driver at the front thereof and mounted in stationary relation to both the magazine and handle sections, the driver having a lower driving end disposed below the lowermost portion of the magazine section, a striker and anvil structure forming part of the head section and mounted for reciprocal movement rectilinearly relative to the driver and normally projecting substantially below said lowermost portion of the magazine section and below the lower end of the driver, and means for feeding staple means from the magazine section into driving position on said striker and anvil structure under the driving tip of said driver so that when the hammer stapler is wielded to strike a surface with the striker and anvil structure the latter and said driver will reciprocate for driving of a staple into the surface.

2. In combination in a hammer stapler, a body casing including a handle section and an enlarged magazine section at the forward end of the handle section, said magazine section having means therein for supporting a coiled strip of sheet metal staple blanks, said means and the lower portion of the casing at the forward part of the magazine section defining a feed throat leading forwardly, and a driving head carried by the forward portion of said casing forwardly of the magazine section and including staple forming and driving means disposed in substantially fixed relation to the casing and a striker and anvil structure mounted reciprocably relative to the staple forming and driving means for cooperation with the staple forming and driving means when the striker is driven against a surface by wielding of the hammer stapler with a hammer-like blow to afford relative movement between the striker and anvil structure and the staple forming and driving means to drive a formed staple from the forward terminus of the staple strip fed from the magazine section and form the next succeeding staple blank into staple form.

3. In combination in a stapling hammer construction, a handle section, a driving head section, and a magazine section intermediate the handle and driving head sections, said magazine section comprising means defining a cavity opening to the right hand side of the magazine section for receiving a coil of sheet metal staple blanks in continuous strip form within the cavity, the opening from the cavity having an openable closure.

4. In a hammer stapler, means providing a handle section, a driving head section and an intermediate magazine section; said magazine section being dimensioned to receive a substantial roll of sheet metal staple blanks in continuous strip form therein and having an opening at one side of the magazine section of sufficient size to receive a staple blank roll therethrough, said magazine section including a casing enclosing the same and having said opening therein, said casing having a slot therein adjacent to said opening, a closure plate for closing said opening and having a hinge flange thereon extending into said slot, means on said flange to prevent withdrawal of the flange from said slot, and means on said closure plate and on said magazine section providing a releasable latch for the closure plate.

5. In combination in a stapling hammer, a handle section, a staple-forming and driving section including mechanism for severing driving and forming a staple from a strip of sheet metal staple blanks as an incident to striking the head against an object to receive a staple, a magazine section intermediate said handle and head sections and including a casing housing portion substantially larger in all dimensions than a staple strip roll to be received therein for delivery of the strip from the roll to said head section, said casing having an opening toward one side of the hammer for receiving a roll therethrough into the magazine section, the opposite side of the magazine section having a wall bulged slightly outwardly and having an indented embossment therein, a generally cup-shaped magazine container shell having the base portion thereof in engagement with the inner side of said bulged wall, a rivet securing said base portion to said bulged wall and having the outer head thereof within said indented embossment, said magazine shell having an opening in the flange wall thereof adjacent to said head section for passage of the staple blank strip from the magazine shell to the head section, a hollow outwardly opening hub secured centrally within said magazine shell to be received in a central hub opening in the staple strip roll, a closure member of outwardly bulged form substantially complementary to said outwardly bulged wall of the magazine section and of a size to close said opening, a latch stud, said closure member having an indentation in the outer surface thereof, said stud having a rivet secured to said closure member and with the head of the rivet in said indentation, and means in the hub member for cooperation with said stud to retain the closure member releasably in closed position, both said bulging wall of the casing and said closure member having the outer surfaces thereof free from outward protrusions throughout at least areas surrounding the respective indentations therein at least as great as the diameter of said magazine shell.

6. In combination in a stapling hammer construction: means providing a handle section; a magazine section forwardly of the handle section and a staple forming and driving head section forwardly of the magazine section; the magazine section having a substantial opening from one side thereof for reception of a roll of sheet metal staples in strip form; means for retaining the roll within the magazine section; said magazine section including a casing providing a housing therefor and having a lower wall slanting downwardly and forwardly to the head section; a generally cup-shaped magazine shell within the magazine section for supporting the staple strip roll, said magazine shell having an opening in the lower forward portion of the circumferential wall thereof for passage of the staple strip therethrough toward the head section; and a guide lip projecting from the upper portion of said opening forwardly and downwardly toward and into spaced relation to the forward portion of the sloping bottom wall of the casing to define therewith a guide throat to the head section.

7. In a hammer stapler, means defining a handle section and a magazine section at the forward end of the handle section and a staple forming and driving head section forwardly of the magazine section, said magazine section comprising a housing casing defining a magazine space therein ample to receive a substantial roll of sheet metal staple blanks in strip form, said casing having an opening from one side of the hammer stapler for reception of the roll therethrough, said casing having an elongated slot therein adjacent to said opening and tangent to a radius of said magazine space, a closure for said opening of sheet material and having integral with the edge thereof a hinge flange directed angularly thereto and dimensioned to fit hingedly through said slot, said flange having a plurality of interlock tabs thereon at the inner edge thereof, said interlock tabs being twisted out of the general plane of the flange and across the axis of said slot to retain the hinge flange against withdrawal from the slot.

8. In combination in a stapling hammer, means defining a handle section and a magazine section at the forward end of the handle section, a head block secured fixedly to the forward portion of the magazine section, a staple driver carried by said block, a striker structure including means engaging said block for reciprocal movement thereon and including a striker normally extending a substantial distance below said block and below said driver, and staple feeding means at the lower end of the block and above said striker and cooperating therewith in each operative stroke of the striker against a surface to receive a staple to feed a succeeding staple into position for driving by the driver as an incident to the next succeeding driving stroke.

9. In combination in a stapling machine, a magazine section having side walls of sheet metal of substantial gauge having as integral extensions thereof respective forwardly projecting supporting strap members, a driving head member engaged and secured to said magazine section by said strap members, and mechanism carried by said head member and operative upon movement relative to the head member to feed staple blanks from the magazine section into driving position relative to the head member.

10. In a stapling machine, means defining a magazine, a head member supported fixedly by said magazine means and having a staple driver fixedly related to the head member, and a slidable casing supported by said head member and including means engageable with a surface into which a staple is to be driven, said casing and said surface-engageable means coming to a stop against said surface during a driving stroke of the machine while the head member and magazine means move with the staple driver toward the surface.

11. In combination in a stapling machine, means defining a magazine section for supporting staple means therein, driving head means on said magazine means, said head means having longitudinal bearing surfaces thereon including spaced bearing shoulders facing generally toward said magazine means, a casing engaging for relative reciprocable movement about said driving head in slidable bearing relation to said bearing surfaces and having retention flanges opposing said shoulders, means at one end of said casing cooperating with the driving means for driving a staple from staple means fed from said magazine in response to relative movement of said casing and said driving means in one direction, and means at the opposite end of said casing for limiting opposite relative movement of said casing and said head means.

12. In combination in a stapling machine, means providing a magazine, driving head means including a portion having elongated bearing surfaces, a staple driver carried by said head portion, a generally tubular member slidably engaging said bearing surfaces of the head portion and carrying means at one end for engagement with a surface into which a staple is to be driven by said staple driver and means at the opposite end for cooperation with said surface-engaging means to define limits of reciprocal movement of said tubular member on said head portion, and means for normally biasing said tubular member to extend said surface-engaging means to maximum extent relative to said head portion.

13. In combination in a stapling machine, means defining a magazine section for housing staple blank means, a supporting head member carried by said magazine means and having a driver projecting in one direction, said head member having bearing surfaces thereon extending parallel to said driver, a member slidable on said head member and having a staple forming and cut-off anvil operatively related to said driving member, a staple forming member associated with said driving member and engageable with a staple blank fed from said magazine section to form the same as an incident to driving of a staple previously formed by said driving member upon movement of said anvil structure toward said driving and forming members by sliding movement of said slidable member, means for normally biasing said anvil and slidable member away from said driving and forming members, and a releasable latching and movement limiting member carried by said slidable member and engageable with said head member at the opposite end of the head member from said driver.

14. In combination in a stapling machine, means defining a magazine section for housing staple blank means, a supporting head member carried by said magazine means and having a driver projecting in one direction, said head member having bearing surfaces thereon extending parallel to said driver, a member slidable on said head member and having a staple forming and cut-off anvil operatively related to said driving member, a staple forming member associated with said driving member and engageable with a staple blank fed from said magazine section to form the same as an incident to driving of a staple previously formed by said driving member upon movement of said anvil structure toward said driving and forming members by sliding movement of said slidable member, means for normally biasing said anvil and slidable member away from said driving and forming members, and a releasable latching and movement limiting member carried by said slidable member and engageable with said head member at the opposite end of the head member from said driver, said biasing means including a reciprocable plunger slidably guided by said head member and driving toward said anvil.

15. In combination in a stapling machine, means defining a magazine section for supporting staple means, a head member attached to said means, a staple driver carried by said head member, a generally tubular casing slidably engaging said head member and movable relative to said magazine section, said casing having a surface-engaging portion at one end thereof cooperative with said driving member to support a staple in driving relation to the driver member as an incident to relative sliding movement of the tubular casing and the head member, means at the opposite end of said tubular casing from said surface-engaging portion and cooperating with the latter for limiting reciprocal movements of said tubular casing relative to the head member, and staple feed means mounted within said head member and cooperating with said surface-engaging portion to feed a staple into position for driving by said driving member as an incident to relative reciprocal movements of the tubular casing and the head member.

16. In combination in a stapling machine, means for supporting a sheet metal staple blank strip, a head member and an anvil member including means interconnecting the same for relative reciprocal movement, said head member having staple driving, severing and forming means and said anvil member having means cooperative with the forming means to form a staple blank and means cooperating with the driving and severing means for severing and driving a staple upon relative reciprocal movements of the anvil and head members, a member rockably mounted in said head member and movable relative thereto with said anvil member, means carried by said head member for rocking said rockable member in one direction upon movement of the anvil member in one direction, means carried by the head member for rocking said rockable member in the opposite direction upon relative movement of the head and anvil members in the opposite direction, and means operable by said rocking member for advancing the staple blank strip by staple blank increments toward the forming and severing and driving means and along said anvil as an incident to each cycle of rocking movement of the rockable member.

17. In combination in a stapling machine: means for supporting a roll of sheet metal staple blanks in strip form; a staple-forming and cut-off anvil forwardly of said supporting means; staple-forming, cut-off and driving means cooperable with the forward portion of the anvil; means supporting said anvil and said staple-forming and cut-off and driving means in relatively reciprocably movable operative relation and including a member providing a guideway directed toward said anvil rearwardly from said staple-forming means; a plunger operable in said guideway; means biasing said plunger toward said anvil for movement with the anvil relative to said member; staple strip feed mechanism at the end portion of said plunger adjacent to said anvil for advancing the staple strip from said supporting means to the staple-forming and cut-off portions of said anvil; and means carried by said member for actuating said staple-feed means as an incident to reciprocations of said plunger with said anvil relative to said member.

18. In combination in a stapling machine, means for supporting a roll of sheet metal staple blanks in strip form, a staple-forming and cut-off anvil, staple-forming, cut-off and driving means, means supporting said anvil and said staple-forming and cut-off and driving means in relatively reciprocably movable operative relation and including a member providing a guideway directed toward said anvil, a plunger operable in said guideway, means biasing said plunger toward said anvil, staple strip feed mechanism for advancing the staple strip from said supporting means to the staple-forming and cut-off portions of said anvil, and means carried by said member for actuating said staple-feed means as an incident to reciprocations of said plunger with said anvil, said feed mechanism including a rockable member and said feed mechanism controlling means carried by said member including adjustably mounted abutment studs.

19. In combination in a stapling machine, means for supplying sheet metal staple blanks in strip form, a head member including staple-forming and driving structure projecting in a direction to receive staple blanks thereunder, an anvil member cooperative with said staple-forming and driving structure and including means movably engaging said head member so that when the anvil member and said head member are moved relatively to bring the anvil member into cooperative relation to the driving and forming structure a staple blank is formed and a formed staple is driven, staple blank strip feeding means mounted within said head member and including a rockable member mounted for movement with said anvil member and including a portion extending upwardly in said head member, a member projecting downwardly from the upper portion of the head member and operative to swing said rockable member in one direction upon movement of the rockable member upwardly relative to said downwardly projecting member, and a member extending angularly to said downwardly projecting member and also carried by said head member and operable to rock said rockable member in the opposite direction upon movement of the rockable member away from said downwardly projecting member, the rocking movements of said rockable member being operative to actuate the feed mechanism to advance the staple strip blank by staple blank increments.

20. In a stapling machine for forming, severing and driving staples from a sheet metal strip partially formed into staple blanks, means for supporting a supply of the strip, a head structure, an anvil member, means on said anvil member and said head structure for driving a formed staple from the leading end of the blank and forming the next succeeding blank into staple shape as an incident to relative movement of the head structure and the anvil member toward one another, the head structure having a hollow rear portion opening downwardly toward said anvil rearwardly from said driving means, staple blank feeding means within the hollow portion of the head structure and cooperative with the anvil member, and an adjustable stud extending down within the head member into said hollow portion and cooperable with the feeding means to actuate the latter upon movement of the anvil and head members toward one another as aforesaid.

21. In combination in a stapling machine, an anvil for receiving a sheet metal staple blank strip thereon, a head member carrying staple-forming and driving means cooperable with said anvil for staple-forming and driving upon relative movement of the anvil and head member toward one another in a driving stroke, staple blank feeding means including a rockable lever and a feed finger lever pivotally carried by the rockable lever, means rockably supporting said rockable lever for movement with the anvil relative to the head member, means carried in fixed relation by the head member for initiating retraction of the feed finger lever by initially partially rocking the rockable lever as an incident to a staple driving stroke, further means carried in fixed relation by the head member for completing rocking of the rockable lever to fully retract the feed finger lever during completion of a staple-forming and driving stroke, and additional means carried in fixed relation by the head member operative as an incident to return of the anvil member and the rockable lever toward retracted relation relative to the head member for rocking the rockable lever reversely to project the feed finger lever forwardly to advance the staple blank strip a staple blank increment forwardly.

22. In combination in a stapling machine, means providing an anvil and shearing member, a head member, said anvil providing a staple blank path toward which the head member is operatively directed, means connecting the anvil and head members for relative operative movement, said head member having a recess therein opening toward said anvil, and staple driving and forming structure mounted within said recess and secured removably therein in substantially fixed relation to the head member and projecting from said head member toward cooperative relation with said anvil member.

23. In combination in a stapling machine, a head member having a downwardly opening recess therein, a forwardly and downwardly opening recess in the forward portion of said head member, a staple strip supporting anvil, means relatively movably connecting said anvil and said member with the anvil under said downwardly opening recess, staple feeding means mounted within said downwardly opening recess, staple driving means mounted within said forwardly and downwardly opening recess, and means securing said staple driving means within said forwardly and downwardly opening recess and including a member projecting into said downwardly opening recess for actuating said feeding means as an incident to movements thereof within said downwardly opening recess.

24. In combination in a stapling machine, a casing providing a housing for a staple blank magazine, a head member having upper and lower ear structures projecting rearwardly therefrom, means securing said ear structures within the forward portion of said casing and forwardly of the magazine, surface-engaging means reciprocably supported by said head member, and means cooperatively related to said member and said surface engaging means for driving staples from blanks supplied from the magazine in the operation of the machine.

25. In combination in stapling mechanism, an anvil structure, a driving head structure, means relatively movably connecting said anvil and driving head structures, means for feeding a sheet metal staple blank strip along said anvil structure, and a shoe member including an upturned rear guide portion and a forward resilient presser leg portion cooperating with said feeding means and maintaining the strip pressed against the anvil structure.

26. In combination in stapling apparatus, an anvil structure, staple-forming and driving structure, means connecting the anvil and driving structures for relative operative movements for forming and driving staples from a sheet metal staple blank strip, staple blank strip feed mechanism including an operating plunger movable relative to said anvil structure and including a reciprocable carrying member, and a presser shoe carried by said carrying member and including a presser leg pressing the staple blank strip against the anvil, said shoe including a portion adjacent to said presser leg operable as an incident to a staple driving and forming stroke of the anvil and driving and forming structures to flatten a substantial length of the staple blank strip against the anvil.

27. In combination in a stapling machine, a driving head structure, an anvil structure, means reciprocably movably connecting the anvil and driving head structures, means for supplying a sheet metal staple blank strip into position between said driving head and anvil structures, means for feeding the staple blank strip incrementally, said anvil structure and connecting means being releasable from said head structure to expose the feeding means, and means associated with the feeding means and cooperative therewith for interengaging with the staple blank strip to hold the staple blank strip in loaded position after initial feeding thereof into such position and until the anvil structure is replaced for normal operation.

28. In combination in a stapling machine, a driving head structure, an anvil structure, means reciprocably movably connecting the anvil and driving head structures, means for supplying a sheet metal staple blank strip into position between said driving head and anvil structures, means for feeding the staple blank strip incrementally, said anvil structure and connecting means being releasable from said head structure to expose the feeding means, and means associated with the feeding means and cooperative therewith for interengaging with the staple blank strip to hold the staple blank strip in loaded position after initial feeding thereof into such position and until the anvil structure is replaced for normal operation, said feeding means including feed fingers having shoulders thereon, and said means cooperative therewith comprising loading fingers opposing said shoulders and operable to engage a staple blank between said shoulders and said loading fingers to hold the same against displacement until the anvil structure has been replaced for normal cooperative relation to the head structure.

29. In combination in stapling apparatus, a striker block having a longitudinal channel therein and upstanding portions defining said channel, an anvil block mounted in said channel and projecting beyond said upstanding portions to provide a staple-forming nose portion forwardly of said upstanding portions.

30. In combination in stapling apparatus, a striker block having a longitudinal channel therein and upstanding portions defining said channel, an anvil block mounted in said channel and projecting beyond said upstanding portions to provide a staple-forming nose portion forwardly of said upstanding portions, said striker block having a pair of upstanding staple blank arm-engaging standard portions spaced forwardly from said upstanding portions and a staple exit opening downwardly through the block between said upstanding standard portions.

31. In combination in a stapling machine, a striker and anvil structure, an elongated tubular supporting member adapted for mounting in reciprocable relation on a driving head, and means securing said striker and anvil structure in the lower end portion of said tubular member for supporting the striker and anvil structure in relatively reciprocably movable operative relation to a driving head.

32. In combination in a stapling machine, an anvil structure including a nose portion adapted to have a sheet metal staple blank formed into U-shape thereover while in strip association with succeeding flat staple blanks, and resilient anti-backtilt means at opposite sides of said anvil nose portion compressible by the newly formed legs of a staple blank and resiliently automatically deflectable into position behind the edges of the staple legs when the staple strip is advanced to carry the formed staple blank beyond the end of the anvil nose portion.

33. In combination in stapling mechanism, an anvil structure including an elongated anvil member having a staple-forming and shearing nose portion and longitudinally extending recesses in the sides thereof, and elongated resilient bowed springs mounted in said recesses and having portions thereof alongside said nose portion and normally flexed outwardly in opposite directions from said nose portion, said outwardly flexed portions of the springs being compressible upon the formation of a U-shaped sheet metal staple over said nose portion and being engageable behind the edges of the formed staple to prevent tilting thereof when the staple is severed from a strip of which it is part for driving the staple.

34. In combination in stapling apparatus, means defining a staple driveway, an anvil disposed adjacent to said driveway, means for severing a formed generally U-shaped sheet metal staple from a strip lying on said anvil and driving the same through said driveway and for forming a succeeding staple blank in the strip into U-shape about said nose portion, and resilient means carried by said anvil structure at the opposite sides of said nose portion and yieldable in response to the pressure of the newly formed legs of a staple blank formed about said nose portion and automatically spreadable into engagement with the rear edges of a formed staple blank upon movement of the formed staple blank into the staple driveway to restrain the legs of the formed staple against tilting rearwardly as an incident to severance of the formed staple from the strip as an incident to severance and driving of the staple.

35. In combination in stapling apparatus, an anvil structure providing a path for a sheet metal staple strip comprising a series of flat staple blanks separated by an integral connecting neck between contiguous blanks, and means for centering the strip on the anvil structure including a pair of divergently related fingers biased toward the anvil and engaging between contiguous staple blanks at opposite sides of the connecting neck therebetween.

36. In combination in a stapling machine, a head structure including staple driving means, an anvil structure mounted for operative movement toward, and away into intended relation to, said head structure, means for supplying staple elements to said anvil structure to be driven therefrom by said driving means upon movement of said anvil structure toward the head structure, biasing spring means engaging with the upper portion of said head structure, and means engaging said anvil structure and having a shoulder in thrust abutment with the biasing spring means normally to bias the anvil structure into extended relation to the head structure.

37. In combination in a stapling machine, a head structure including staple driving means, an anvil structure mounted for operative movement toward, and away into extended relation to, said head structure, means for supplying staple elements to said anvil structure to be driven therefrom by said driving means upon movement of said anvil structure toward the head structure, biasing spring means engaging with the upper portion of said head structure, and means engaging said anvil structure and having a shoulder in thrust abutment with the biasing spring means normally to bias the anvil structure into extended relation to the head structure, said anvil-engaging means including a plunger having a presser foot in engagement with the anvil.

38. In combination in a stapling machine, a head structure including staple driving means, an anvil structure mounted for operative movement toward, and away into extended relation to, said head structure, means for supplying staple elements to said anvil structure to be driven therefrom by said driving means upon movement of said anvil structure toward the head structure, biasing spring means engaging with the upper portion of said head structure, and means engaging said anvil structure and having a shoulder in thrust abutment with the biasing spring means normally to bias the anvil structure into extended relation to the head structure, said anvil-engaging means comprising a guide casing engaging said head structure and said biasing spring means comprising a pair of compression springs disposed between the sides of the casing and the head structure.

39. In combination in a stapling machine, means for supplying transversely straight sheet metal staple blanks in strip form from a roll, anvil structure providing a flat surface over which the strip of staple blanks is fed from the roll, means for forming into U-shape staple form the terminal blanks of the strip and driving the same from the anvil, and means operative in coordinated relation with said forming and driving means to spank a portion of the strip rearwardly from the terminal blanks thereof against said flat surface to assure flat condition of that portion of the strip before it is fed to the forming and driving means.

40. In a stapling machine including means for supplying a sheet metal staple blank strip from a roll and means for forming and driving staples from the strip, means located between the supply means and the forming and driving means for straightening and flattening the strip before it reaches the forming and driving means.

WILLIAM R. BECKMAN.
ARTHUR G. SCHILKE.
CHARLES E. CROOKS.

References Cited in the file of this patent

UNITED STATES PATENTS

| Number | Name | Date |
|---|---|---|
| 1,036,841 | Heim | Aug. 27, 1912 |
| 1,067,541 | Palmgren | July 15, 1913 |
| 1,897,625 | Svensson | Feb. 14, 1933 |
| 2,174,708 | Sears et al. | Oct. 3, 1939 |